(12) United States Patent
Brown et al.

(10) Patent No.: US 8,761,209 B1
(45) Date of Patent: Jun. 24, 2014

(54) SYSTEM AND METHOD FOR THE AGGREGATION OF 10GBASE-R SIGNALS INTO PSEUDO 100GBASE-R SIGNALS

(75) Inventors: Matthew Brown, Kinburn (CA); Dimitrios Giannakopoulos, Metheun, MA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 414 days.

(21) Appl. No.: 13/285,562

(22) Filed: Oct. 31, 2011

(51) Int. Cl.
*H04J 3/02* (2006.01)
*H04L 12/54* (2013.01)
*H04L 29/06* (2006.01)

(52) U.S. Cl.
USPC .......................... 370/540; 370/544; 370/535

(58) Field of Classification Search
USPC ........................................ 370/535, 540, 544
See application file for complete search history.

(56) References Cited

U.S. PATENT DOCUMENTS

| | | | |
|---|---|---|---|
| 8,385,346 B2 * | 2/2013 | Diab et al. | 370/394 |
| 2010/0092174 A1 * | 4/2010 | Brown et al. | 398/79 |
| 2013/0083810 A1 * | 4/2013 | Ghiasi et al. | 370/535 |

* cited by examiner

*Primary Examiner* — Marsha D Banks Harold
*Assistant Examiner* — Matthew Campbell
(74) *Attorney, Agent, or Firm* — Amin, Turocy & Watson, LLP

(57) ABSTRACT

An Ethernet physical layer (PHY) module is provided with a method for transceiving between a 10GBASE-R client interface and a 100G attachment interface. On each of ten client interface logical lanes a 10GBASE-R signal is accepted. Each 10GBASE-R logical lane is demultiplexed into two 5 gigabit per second (Gbps) pseudo 100GBASE-R logical lanes, creating a total of twenty pseudo 100GBASE-R logical lanes. The pseudo 100GBASE-R logical lanes are arranged into n groups of 20/n pseudo 100GBASE-R logical lanes. Further, the pseudo 100GBASE-R logical lanes from each group are arranged into a 100G attachment logical lane. Finally, a 100G attachment logical lane is transmitted at an attachment interface on each of n physical lanes. In the reverse direction, each of n physical lanes accepts a 100G attachment logical lane at the attachment interface, and a de-aggregation process supplies a 10GBASE-R signal on each of ten client interface logical lanes.

23 Claims, 19 Drawing Sheets

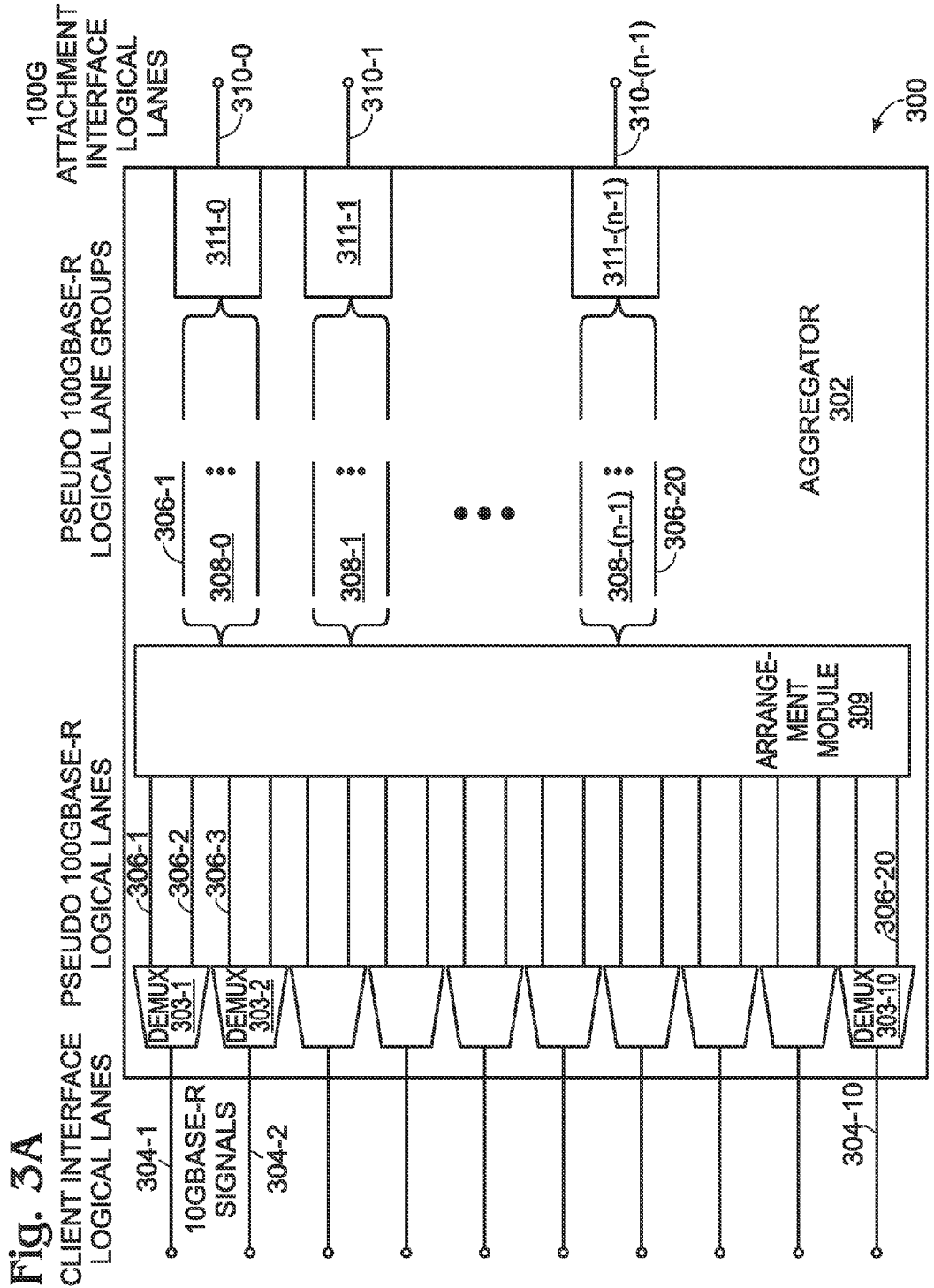

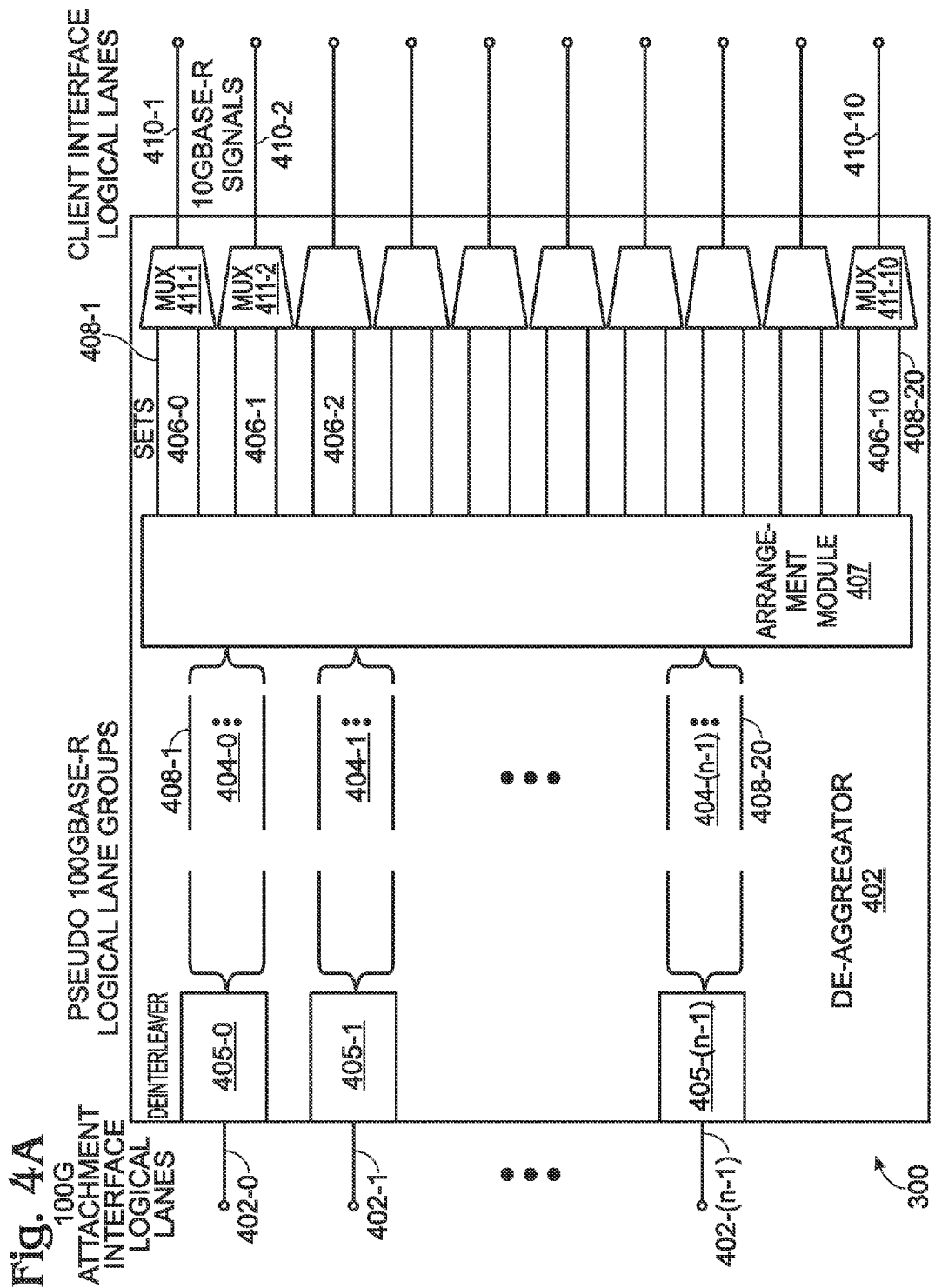

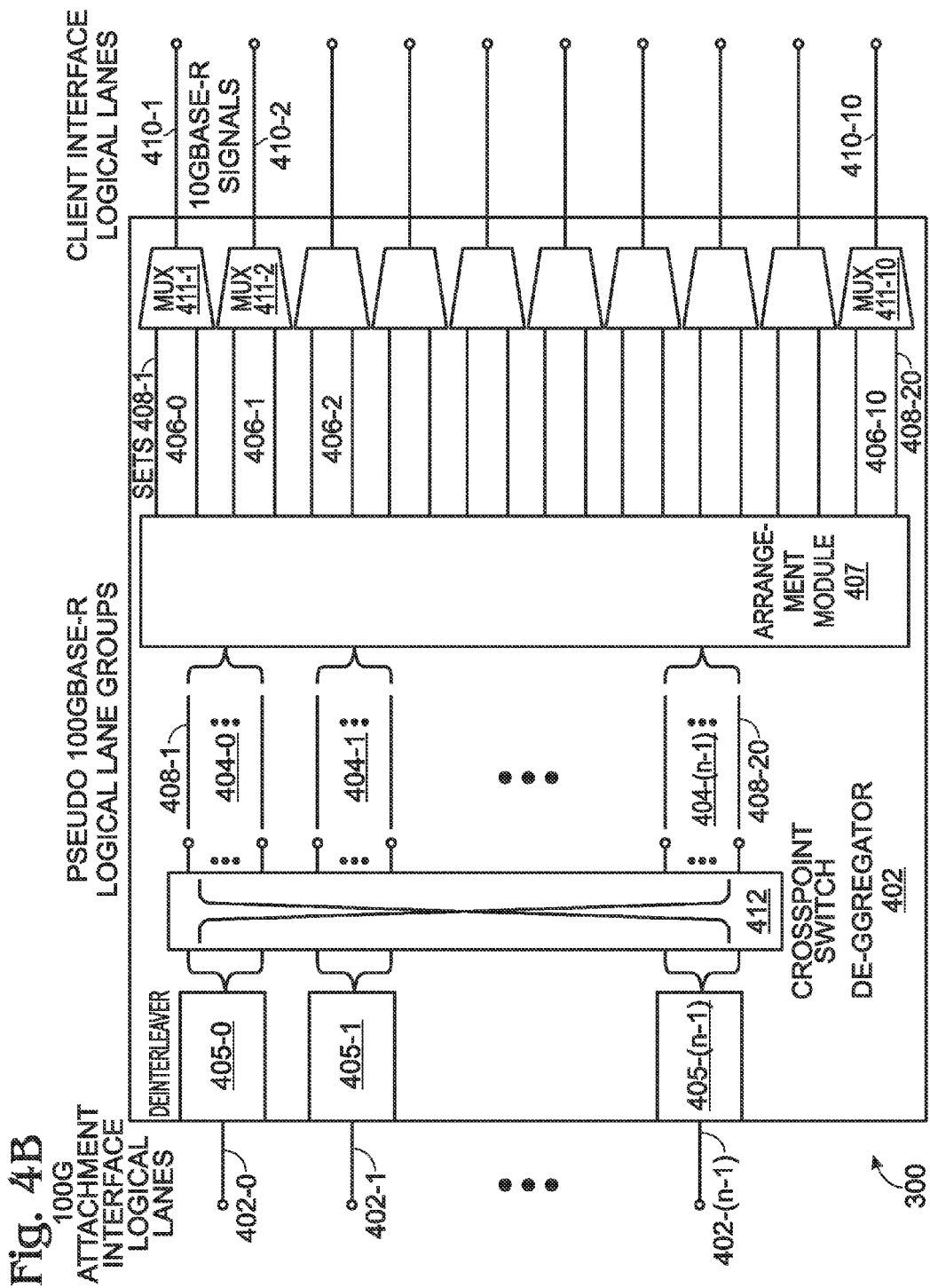

SYSTEM AND METHOD FOR THE AGGREGATION OF 10GBASE-R SIGNALS INTO PSEUDO 100GBASE-R SIGNALS

BACKGROUND OF THE INVENTION

1. Field of the Invention

This invention generally relates to digital communications and, more particularly, to the aggregation of 10GBASE-R channels into single pseudo 100GBASE-R channels that may be transported over links designed for 100GBASE-R channels.

2. Description of the Related Art 802.3ba: IEEE Std 802.3ba™-2010.

802.3: IEEE Std 802.3™-2008.

10G: 10 gigabits per second (Gbps). As used herein, all rates and bandwidths are defined as being nominal or as approximately accurate.

100G: 100 gigabits per second (Gbps).

10GBASE-R: This is a signaling protocol defined by IEEE 802.3 in IEEE-802.3-2008 for serial transmission of a 100 data stream across various media.

100GBASE-R: This is a signaling protocol defined by 802.3ba for transmission of an aggregate 100G data stream across various media using one (100G), two (50G), four (25G), five (200), or ten (100) physical lanes.

10GBASE-R channel: An independent 10G data stream with 10GBASE-R formatting.

100GBASE-R channel: An independent 100G data stream with 100GBASE-R formatting.

100GBASE-R logical lane: 100GBASE-R PCS lane as specified in the 802.3ba. 100GBASE-R is composed of 20 5 Gbps logical lanes that may be multiplexed together for transport over higher rate lanes.

100GBASE-R physical lane: 100GBASE-R is transported over links composed of 1, 2, 4, 5, 10, or 20 physical lanes. Each 100GBASE-R physical lane is composed of 1 or more 100G logical lanes. For instance, in a CAUI-10 interface there are 10 physical lanes of 10 Gbps each composed of 2 100GBASE-R logical lanes each.

10GBASE-R link: A physical connection between two devices or end points, e.g., 10GBASE-SR.

100GBASE-R link: A physical connection between two devices or end points, e.g., CAUI-10 or 100GBASE-SR4.

CAUI-10: An inter-device connection for 100G Ethernet as specified in 802.3ba Annex 83A and 83B, where it is referred to as CAUI. The label CAUI-10 is used in this document instead of CAUI, to explicitly differentiate it from CAUI-4 described below.

CAUI-4: This is a physical instantiation of 100 in 4 lanes across a copper medium for interconnection between a MAC device and a PHY device, or between a pair of PHY devices typically on the same board or between a device on a board and a physical module. The physical requirements of CAUI-4 are not defined by IEEE 802.3 at the time of this writing, but as used herein, it is a 4-lane instantiation of 100GBASE-R % (as defined above). As used herein, CAUI-4 is intended to also include other similar interfaces such as CPPI-4 (yet to be defined by IEEE 802.3) and OIF-28G-VSR.

AM: Alignment marker as defined for 100GBASE-R in 802.3 Clause 82. The AM is a special 64B/66B block.

PCS: Physical coding sub-layer as defined in 802.3.

PMA: Physical medium attachment sub-layer defined in 802.3.

PMD: Physical medium dependent sub-layer defined in 802.3.

CFP: The first generation of standardized module type for 100G Ethernet transceivers using a 10×10G host interface.

CFP2: The yet to be defined, second generation of standardized module type for 100G Ethernet transceivers using a 4×25G host interface.

Inter-frame: In Ethernet data streams, this is as defined in 802.3 is the signal content between Ethernet packets defined as being between the last byte of the MAC packet FCS and the last byte before the preamble of the next MAC packet and includes the /T/ character. In 10GBASE-R this content may be IDLE ordered sets, sequence ordered sets, signal order sets or control ordered sets (e.g., error codes). For the purposes of rate adaptation groups of 4 IDLE characters (IDLE order sets) may be inserted or IDLE ordered sets and sequence ordered sets may be deleted.

Sequence ordered set: This is a 4-octet group of bytes a described in 802.3 Clause 46.

Block: A 64B/66B block as defined for 10GBASE-R in 802.3 Clause 49 and for 100GBASE-R in 802.3ba Clause 82. This is a 66-bit block with a two-bit sync header and 64-bit payload.

FIFO: First-in-first-out buffer is a buffer with an input and output. The buffer is flexible in size. As words are input the buffer fills. Words are read out in the same order that they are put into the buffer.

CPPI: 100G parallel physical interface between PMA and PMD on a PCB. CPPI is specified in IEEE 802.3ba-2010 Annex 86A as a 10-lane interface. As used herein, other non-standard lane widths (CPPI-N) such as CPPI-4 with 4 25G per lane are also considered.

Attachment interface: A general term encompassing various inter-device interfaces such as CAUI-4, CAUI-10, and CPPI-N, defined above.

FIG. 1 is a schematic block diagram depicting a 10×10G interconnection between a medium access control (MAC) device and a line interface module (prior art). Conventional implementations of 100G modules designed for transport of 100G Ethernet connect a 100G MAC device through a CAUI-10 interface with 10 physical lanes of 10 Gbps each. The CAUI-10 interface may be configured as either a single 100GBASE-R link striped across 10 physical lanes (per 802.3ba) carrying signal 100GBASE-R channel, or it can be configured as 10 independent 10GBASE-R links carrying a single 10GBASE-R channel on each link.

If the line side of the module is a 100GBASE-R link, then the 100GBASE-R channel on the system side is mapped to and from the 100GBASE-R link on the line side. If the line side of the module is 10 GBASE-R links, then each of the 10GBASE-R channels on the system side may be mapped directly to one of the 10GBASE-R links on the line side.

FIG. 2 is a schematic block diagram of a 4×25G interconnect between a MAC device and a line interface module (prior art). Note: a 4×25G interface is likely to be standardized after the filing of this application. Proposed generations of line interface modules may condense the attachment interface to 4 physical lanes of 25 Gbps each. There will, therefore, no longer be a one-to-one mapping from a 10GBASE-R link on the system side to a 10GBASE-R link on the line side. Instead, 2.5 10GBASE-R channels must be mapped into each 25G physical lane. At the time of this writing there is no common or publically known method for aggregating 2.5 10GBASE-R channels into each 25G physical lane, while retaining the signaling rate and format of the 100GBASE-R channel. This issue was identified as unresolved in the Jun. 12, 2011 meeting of the Optical Internetworking Forum PLL working group.

It would be advantageous if 10 10GBASE-R channels could be transparently transported over links designed for 100GBASE-R without modifying the data content of the 10GBASE-R channels. For example, it would be advantageous if 10 10GBASE-R channels could be transported over multi-lane 100G attachment interfaces such as a 4-lane by 25 Gbps CAUI-4 interface. As another example, it would be advantageous if 10 10GBASE-R channels could be carried over a 100GBASE-R electrical or optical link operating at 100 Gbps.

SUMMARY OF THE INVENTION

Disclosed herein is a method for aggregating 10GBASE-R channels into 250 physical lanes, while retaining the signaling rate and format of the 100GBASE-R channel. Alternatively, a set of 10 10GBASE-R channels may be aggregated into a single pseudo 100GBASE-R channel for the purpose of carrying the 10 10GBASE-R channels over a 100GBASE-R link. In this case, the 10GBASE-R channels may be transported as part of a 100GBASE-R link to another MAC device where the 10 10GBASE-R channels are decomposed from the pseudo 100GBASE-R channel.

Accordingly, in an Ethernet physical layer (PHY) module, a method is provided for transceiving between a 10GBASE-R client interface and a 100G attachment interface. On each of ten client interface logical lanes a 10GBASE-R signal is accepted. Each 10G BASE-R logical lane is demultiplexed into two 5 gigabit per second (0 bps) pseudo 100GBASE-R logical lanes, creating a total of twenty pseudo 100GBASE-R logical lanes. The twenty pseudo 100GBASE-R logical lanes are arranged, interleaved for example, into n groups of 20/n pseudo 100GBASE-R logical lanes. Further, the pseudo 100GBASE-R logical lanes from each group are arranged into a 100G attachment logical lane. Finally, a 100G attachment logical lane is transmitted at an attachment interface on each of n physical lanes.

In the reverse direction, each of n physical lanes accepts a 100G attachment logical lane at the attachment interface. Each 100G attachment logical lane is deinterleaved into a group of 20/n pseudo 100GBASE-R logical lanes. The n groups of 20/n pseudo 100GBASE-R logical lanes are arranged into ten sets, where each set includes two pseudo 100GBASE-R logical lanes. The two pseudo 100GBASE-R logical lanes in each set are multiplexed into a 10GBASE-R logical lane, creating a total of ten 10GBASE-R logical lanes. Then, on each of ten client interface logical lanes a 10GBASE-R signal is transmitted.

Additional details of the above-described method, and an Ethernet PHY module with a system for transceiving between a 10GBASE-R client interface and a 100G attachment interface, are provided below.

BRIEF DESCRIPTION OF THE DRAWINGS

FIGS. 3A and 3B are schematic block diagrams of an Ethernet physical layer (PHY) module with a system for transceiving between a 10GBASE-R client interface and a 100G attachment interface.

FIGS. 4A and 4B are schematic block diagrams depicting a de-aggregation component of the system.

DETAILED DESCRIPTION

Figure 1:
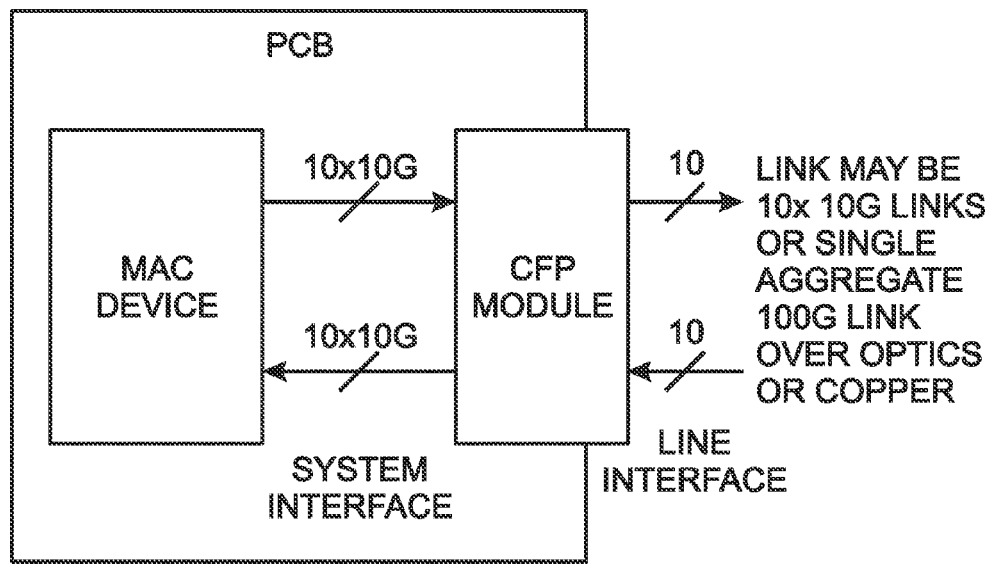
FIG. 1 is a schematic block diagram depicting a 10×10G interconnection between a medium access control (MAC) device and a line interface module (prior art).
Figure 2:
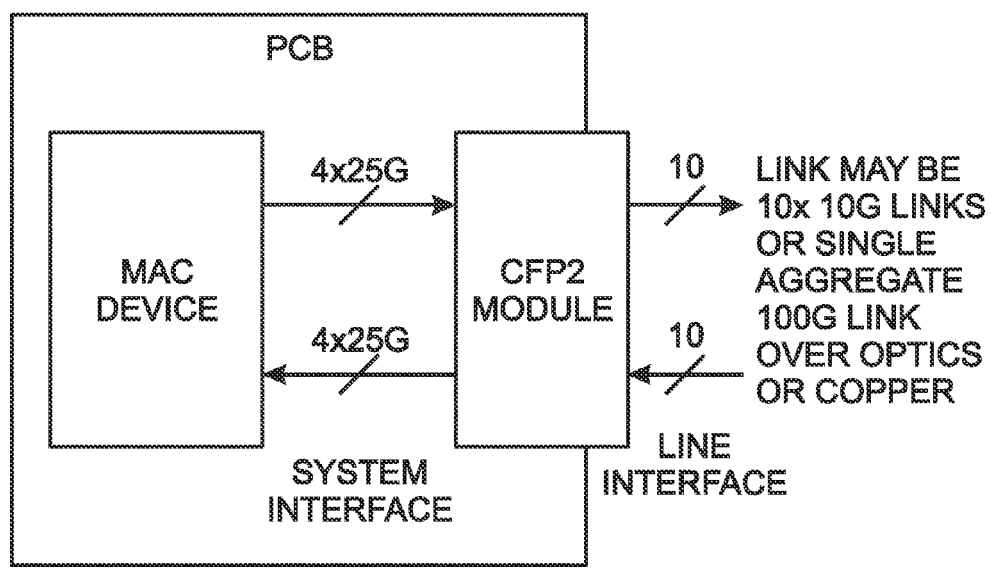
FIG. 2 is a schematic block diagram of a 4×25G interconnect between a MAC device and a line interface module (prior art).

FIG. 3 is a schematic block diagram of an Ethernet physical layer (PHY) module with a system for transceiving between a 10GBASE-R client interface and a 100G attachment interface. As shown in FIG. 3A, the system 300 comprises an aggregator 302 having a client interface of ten logical lanes 304-1 through 304-10. Each logical lane 304 accepts a 100GBASE-R signal. In one aspect, the aggregator client interface has a physical lane associated with each logical lane. The aggregator 302 demultiplexes each 10GBASE-R logical lane using demultiplexers (DEMUXs) 303-1 through 303-10, into two 5 gigabit per second (Gbps) pseudo 100GBASE-R logical lanes, creating a total of twenty pseudo 100GBASE-R logical lanes 306-1 through 306-20. The aggregator 302 arranges the twenty pseudo 10GBASE-R logical lanes 306 into n groups of 20/n pseudo 100GBASE-R logical lanes 308-0 through 308-(n-1) using arrangement module 309, and also arranges the pseudo 100GBASE-R logical lanes from each group 308 into a 100G attachment logical lane using arrangement modules 311-0 through 311-(n-1). In one aspect, the aggregator 302, specifically the arrangement modules 311, interleaves the 20/n pseudo 100GBASE-R logical lanes from each group into a 100G attachment logical lane. The aggregator 302 has an attachment interface 310 to transmit a 100G attachment logical lane on each of n physical lanes 310-0 through 310-(n-1). Although the figure implies that the value of n must be at least 3, the value of n is typically equal to 1, 2, 4, 5, or 10.

As defined herein, a logical lane is an abstract construction, not a signal that can be physically observed. In contrast, a physical lane is a physical construct that carries an electrical signal that may be physically measured.

A pseudo 100GBASE-R is a 100G signal generated for the purpose of carrying 10 10GBASE-R channels over a 100G inter-connect or link. The signal rate and format of this signal is similar to a compliant 100GBASE-R signal so that it may be transparently transported on 100GBASE-R inter-connect and links.

As used herein, interleaving is a specific form of multiplexing. Multiplexing merges two or more signals into a single signal. Interleaving specifically and sequentially puts a piece from each incoming signal in a predetermined order. Demultiplexing is the opposite operation, where signals (i.e. sub-signals) are extracted from a larger signal. Deinterleaving is a special form of demultiplexing where the sub-signals are extracted by sequentially taking one piece at a time and allocating each to one of the sub-signals in a predetermined order.

The following is an example of interleaving sub-signals <a> and <b>:

Input 1: . . . <a1><a2><a3> . . . .
Input 2: . . . <b1><b2><b3> . . . .
Inputs 1 and 2 interleaved: . . . <a1><b1><a2><b2><a3><b3> . . . .

As explained in more detail below, one feature of 100GBASE-R is that the 5G 100GBASE-R logical lanes can be simply bit—interleaved together. It is therefore easy to interleave and deinterleave without first aligning to a 64B/66B block. It is further possible to interleave bit-wise five 5G lanes together into a 25G lane, then bit-interleave the 25G lanes together to form a 50G signal. The 100GBASE-R logical lanes may be extracted simply by bit deinterleaving every $10^{th}$ bit of the 50G lane to a corresponding 5G logical lane.

In one aspect, the aggregator 302 interleaves the 20/n pseudo 100GBASE-R logical lanes from each group 308 into one of the following interfaces: 100 Gbps (gigabit per second) 10×10G Attachment Unit Interface (CAUI-10) interface, 100 Gbps 4×25G Attachment Unit Interface (CAUI-4) interface, 100 Gbps CPPI-N interface where N is 1, 2, 4, 5, or 10, or 100GBASE-<a>R<b>, where <a> represents the interface type and <b> represents the number of physical lanes (e.g., 100GBASE-SR4 or 100GBASE-CR10.

In another aspect the aggregator 302, subsequent to accepting the 10GBASE-R signals at the client interface 304, synchronizes the 10GBASE-R signals. As explained in more detail below, the aggregator 302 synchronizes the 10GBASE-R signals on line 304 by descrambling 10GBASE-R 64B/66B blocks, and modifying the quantity of 10GBASE-R 64B/66B blocks to adapt (modify) data rates, as the clock rates of the aggregator and the device(s) on the other end of the client interface need not necessarily use synchronized clocks. Once the rate is adapted, the aggregator 302 re-scrambles the 10GBASE-R 64B/66B blocks.

In one specific example, the aggregator 302 synchronizes the GBASE-R signals on line 304 by decoding 10GBASE-R 64B/66B blocks into XGMII signals, modifying the quantity of XGMII groups to adapt data rates, and encoding the XGMII groups into 10GBASE-R 64B/66B blocks.

Figure 3B:
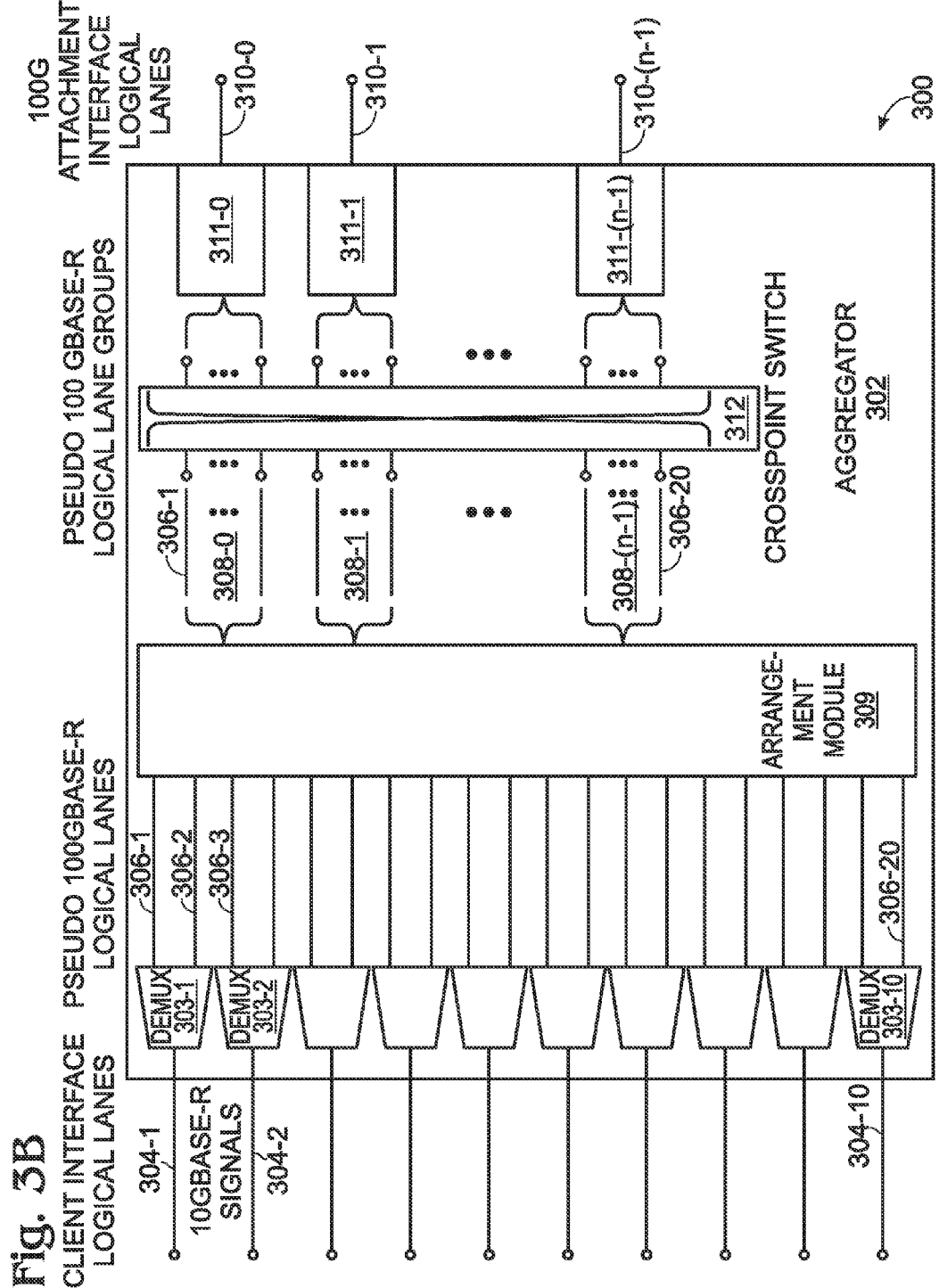

As shown in FIG. 3B, the aggregator may additionally comprise a crosspoint switch 312. The aggregator 302, subsequent to arranging the twenty pseudo 100GBASE-R logical lanes into n groups of 20/n pseudo 100GBASE-R logical lanes 308, crosspoint switches the twenty pseudo 100GBASE-R logical lanes. A crosspoint switch output feeds the attachment interface logical lanes. The crosspoint switching permits any of the pseudo 100GBASE-R logical lanes in any of the groups to be directed to any of the attachment interface logical lanes 310.

FIGS. 4A and 4B are schematic block diagrams depicting a de-aggregation component of the system 300. As shown in FIG. 4A, de-aggregator 402 has an attachment interface to accept a 100G attachment logical lane on each of n physical lanes 402-0 through 402-(n-1). The de-aggregator deinterleaves each 100G attachment logical lane into a group of 20/n pseudo 100GBASE-R logical lanes 404-0 through 404-(n-1) using deinterleavers 405-0 through 405-(n-1), respectively. Then, the de-aggregator 402 arranges the n groups of 20/n pseudo 100GBASE-R logical lanes 404 into ten sets 406-1 through 406-10 using arrangement module 407, where each set 406 includes two pseudo 100GBASE-R logical lanes 408. The de-aggregator 402 multiplexes the two pseudo 100GBASE-R logical lanes 408 in each set 406 into a 10GBASE-R logical lane using multiplexers (MUXs) 411-1 through 411-10, creating a total of ten 10GBASE-R logical lanes 410-1 through 410-10. The de-aggregator 400 transmits each 10GBASE-R signal via a logical lane 408 at the client interface. As in the aggregator, the value of n is typically equal to 1, 2, 4, 5, or 10.

As shown in FIG. 4B, the de-aggregator 402 may further comprise a crosspoint switch 412. Prior to arranging the twenty pseudo 100G-BASE-R logical lanes into n groups of 20/n pseudo 100GBASE-R logical lanes, the de-aggregator 403 may crosspoint switch the twenty pseudo 100GBASE-R logical lanes.

Functional Description

The aggregator reformats each 10GBASE-R channel into a pair of pseudo 100GBASE-R lanes thus making the set of 10 10GBASE-R channels look like 20 lanes of a 100GBASE-R channel, referred to above as a pseudo 100GBASE-R channel. The de-aggregator function re-formats each pair of pseudo 100GBASE-R lanes into a single 10GBASE-R channel thus reverting the pseudo 100GBASE-R channel into 10 10GBASE-R channels.

Figure 5:
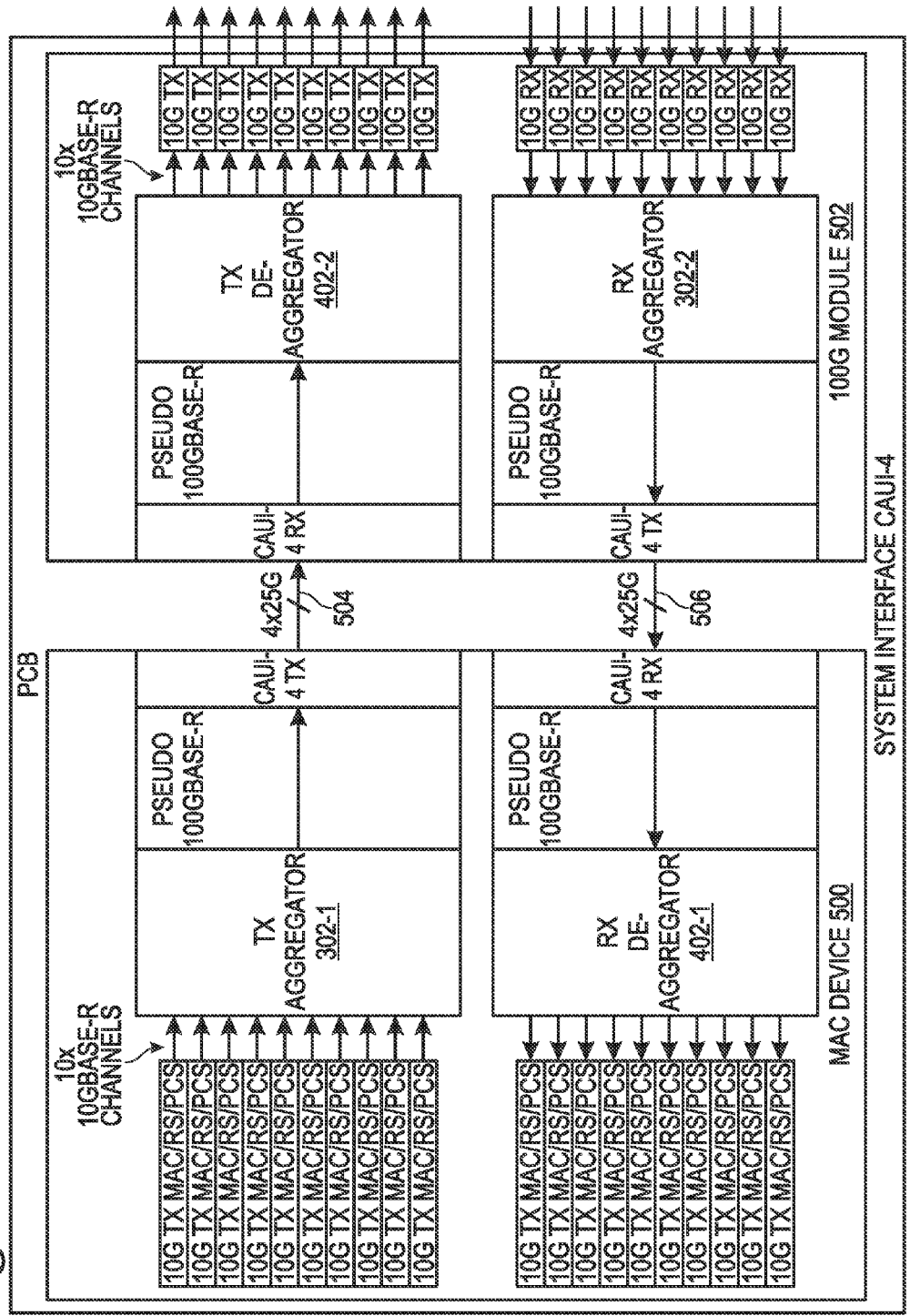
FIG. 5 is a simplified schematic block diagram depicting a CAUI-4 application of the aggregator and de-aggregator.

FIG. 5 is a simplified schematic block diagram depicting a CAUI-4 application of the aggregator and de-aggregator. In the transmit direction (top path) a set of 10 10GBASE-R channels are converted by the MAC device 500 TX aggregator 302-1 to form a set of 20 pseudo 100GBASE-R lanes. The pseudo 100GBASE-R lanes are interleaved by the CAUI-4 TX function to form 4 physical lanes 504 of 25 Gbps each, and transmitted to a CAUI-4 receiver on an attached 100G module 502. The CAUI-4 RX on the 100G module deinterleaves the 20 pseudo 100GBASE-R lanes and the TX de-aggregator 402-2 reverts each pair of pseudo 100GBASE-R lanes to a 10GBASE-R channel. The module 502 then transmits each 10GBASE-R channel by means of the supported PMA/PMD function over a 10GBASE-R link. Each 10GBASE-R signal pair (RX and TX) is an independent link which may be terminated at the other end by a completely independent remote receiver.

In the receive direction (bottom path) a set of 10 independent 10GBASE-R links are received by the supported PMA/PMD functions, and a set of 10 10GBASE-R channels are sent to the RX aggregator 302-2. The 10 10GBASE-R channels are converted by the RX aggregator 302-2 to form a set of 20 pseudo 100GBASE-R lanes. The pseudo 100GBASE-R lanes are interleaved by the CAUI-4 TX function to form 4 physical lanes 506 of 25 Gbps each, and transmitted to a CAUI-4 receiver (de-aggregator 402-1) on an attached 100G MAC device 500. The CAUI-4 RX on the 100G MAC device deinterleaves the 20 pseudo 100GBASE-R lanes and the RX de-aggregator reverts each pair of pseudo 100GBASE-R lanes to a 10GBASE-R channel. The 100G MAC device then terminates each of the 10GBASE-R channels conventionally.

Figure 6A:
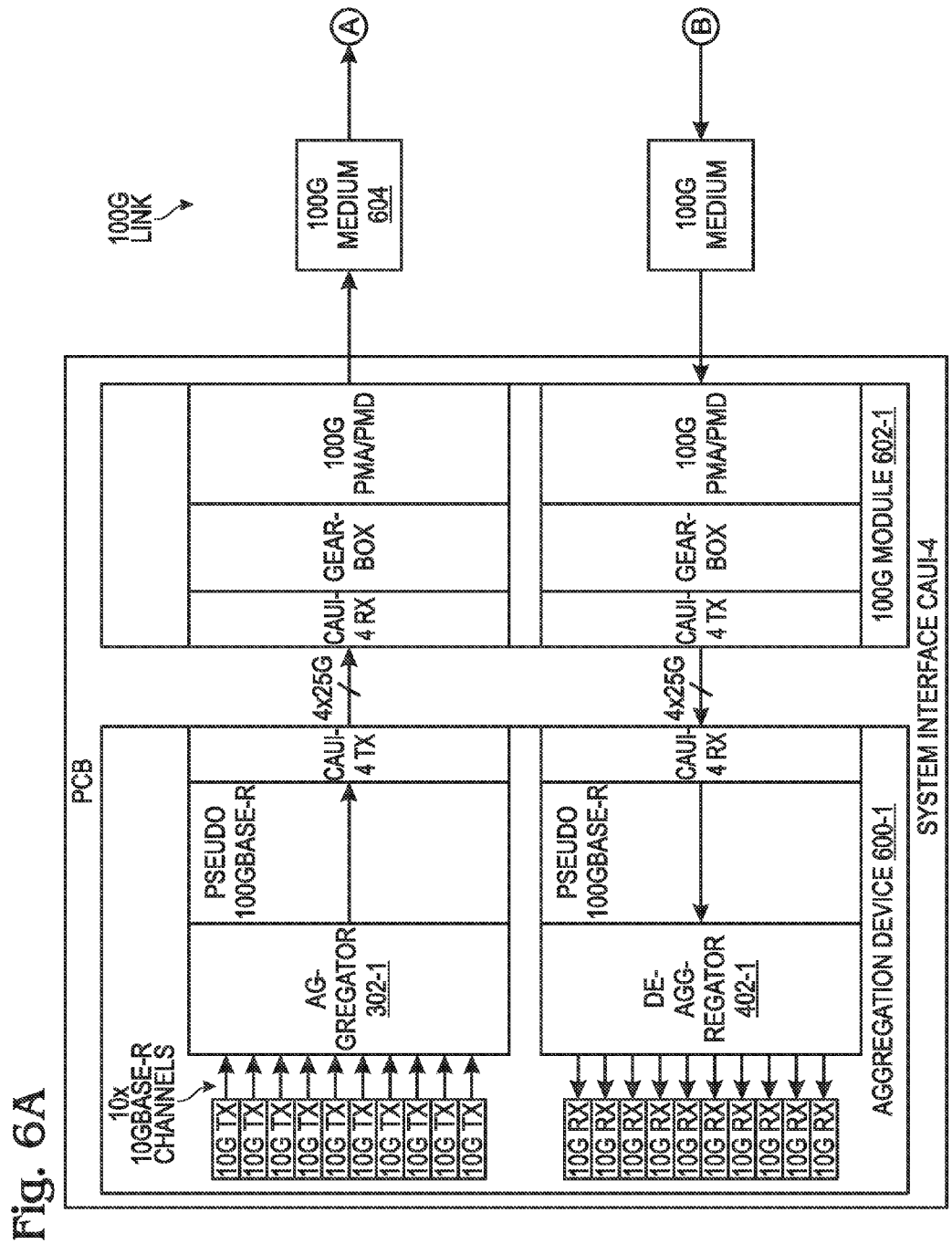
FIGS. 6A and 6B are schematic block diagrams depicting a second application of the aggregation and de-aggregation functions.
Figure 6B:
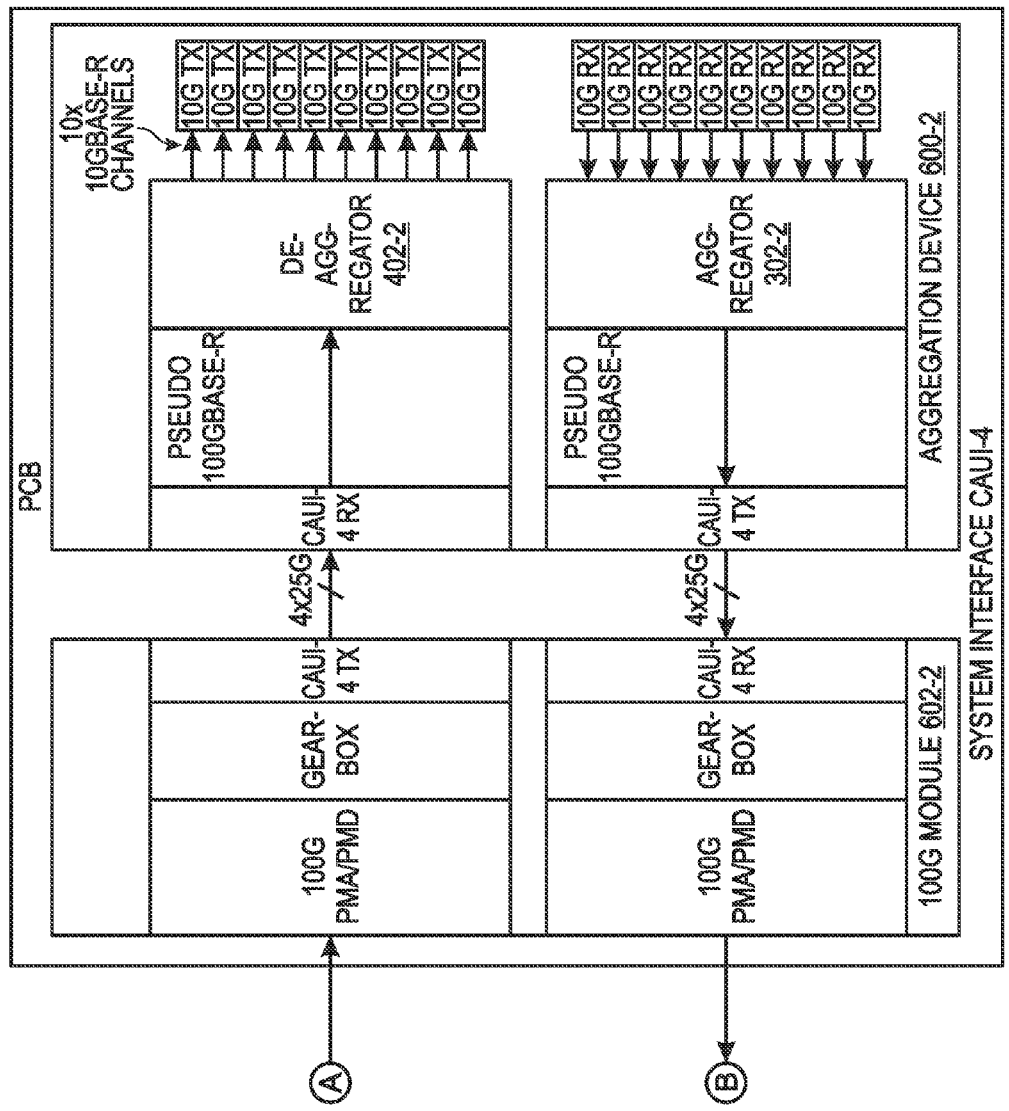

FIGS. 6A and 6B are schematic block diagrams depicting a second application of the aggregation and de-aggregation functions. The upper and lower paths function in an equivalent manner, in different directions. On the transmit path of the aggregation device 600-1, a set of 10 10GBASE-R channels are converted by the TX aggregator 302-1 to form a set of 20 pseudo 100GBASE-R lanes. The 100GBASE-R lanes are interleaved by the CAUI-4 TX function to form 4 lanes of 25 Gbps each and transmitted to a CAUI-4 receiver on the transmit path of an attached 100G module 602-1. The module 602-1 converts and transmits the 100G signal in a conventional manner across a 100G link 604. A second module 602-2 receives the 100G signal on the receive path and converts it to a CAUI-4 signal conventionally. A CAUI-4 receiver in a second de-aggregation device 402-2 receives the CAUI-4 signal and de-interleaves the 20 pseudo 100GBASE-R lanes. The de-aggregator 402-2 converts the pseudo 100GBASE-R lanes to a set of 10 10GBASE-R channels.

The above-described applications leverage a number of sub-systems known publicly as described and specified by IEEE 802.3 and 802.3ba documents, and others. A practitioner with skill in the art would understand the details of these specifications.

Figure 7:
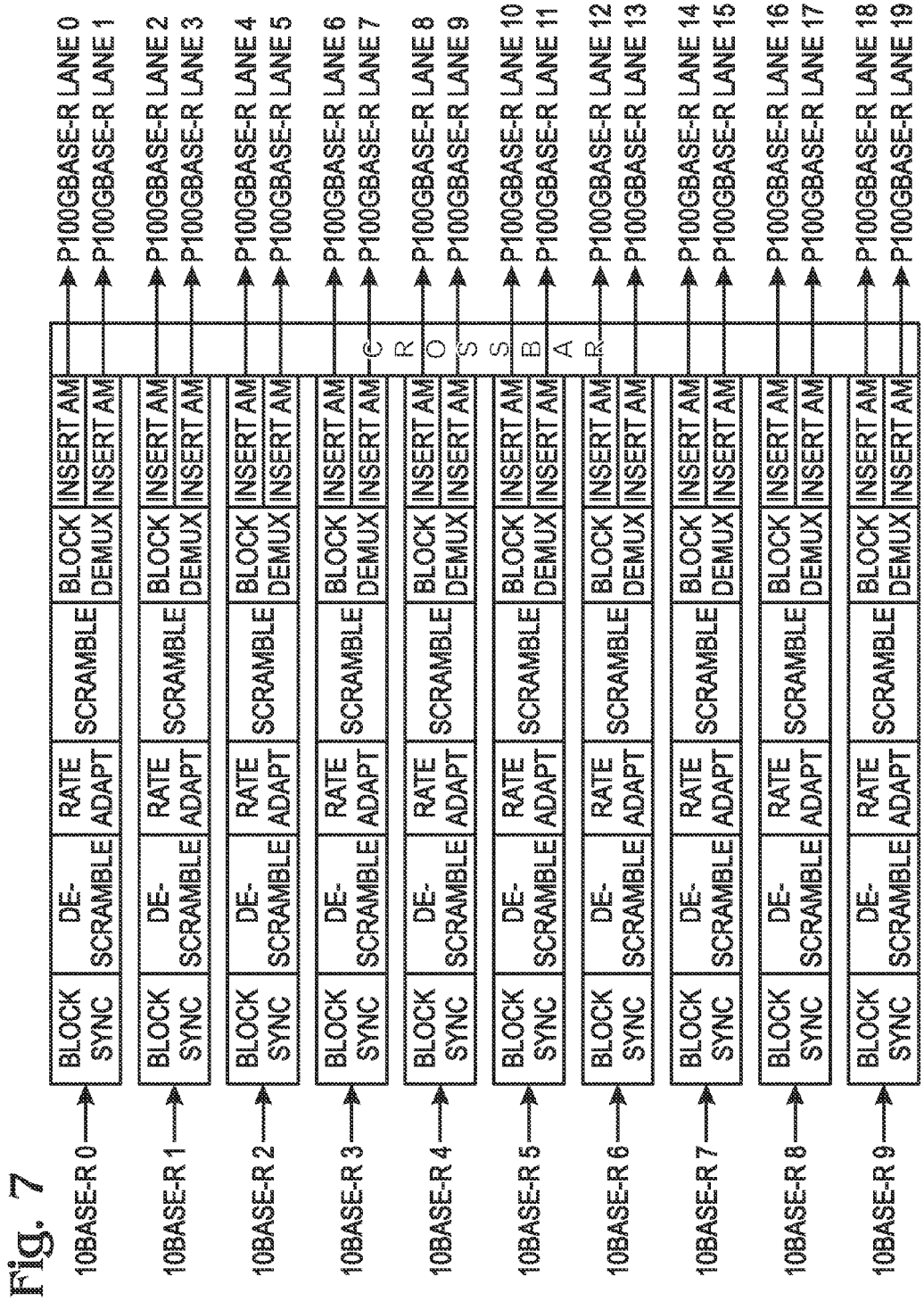
FIG. 7 is a diagram of the aggregator showing additional functions not depicted in FIG. 3B.

FIG. 7 is a diagram of the aggregator showing additional functions not depicted in FIG. 3B. The aggregator of FIG. 7 does not use PCS termination.

Figure 8:
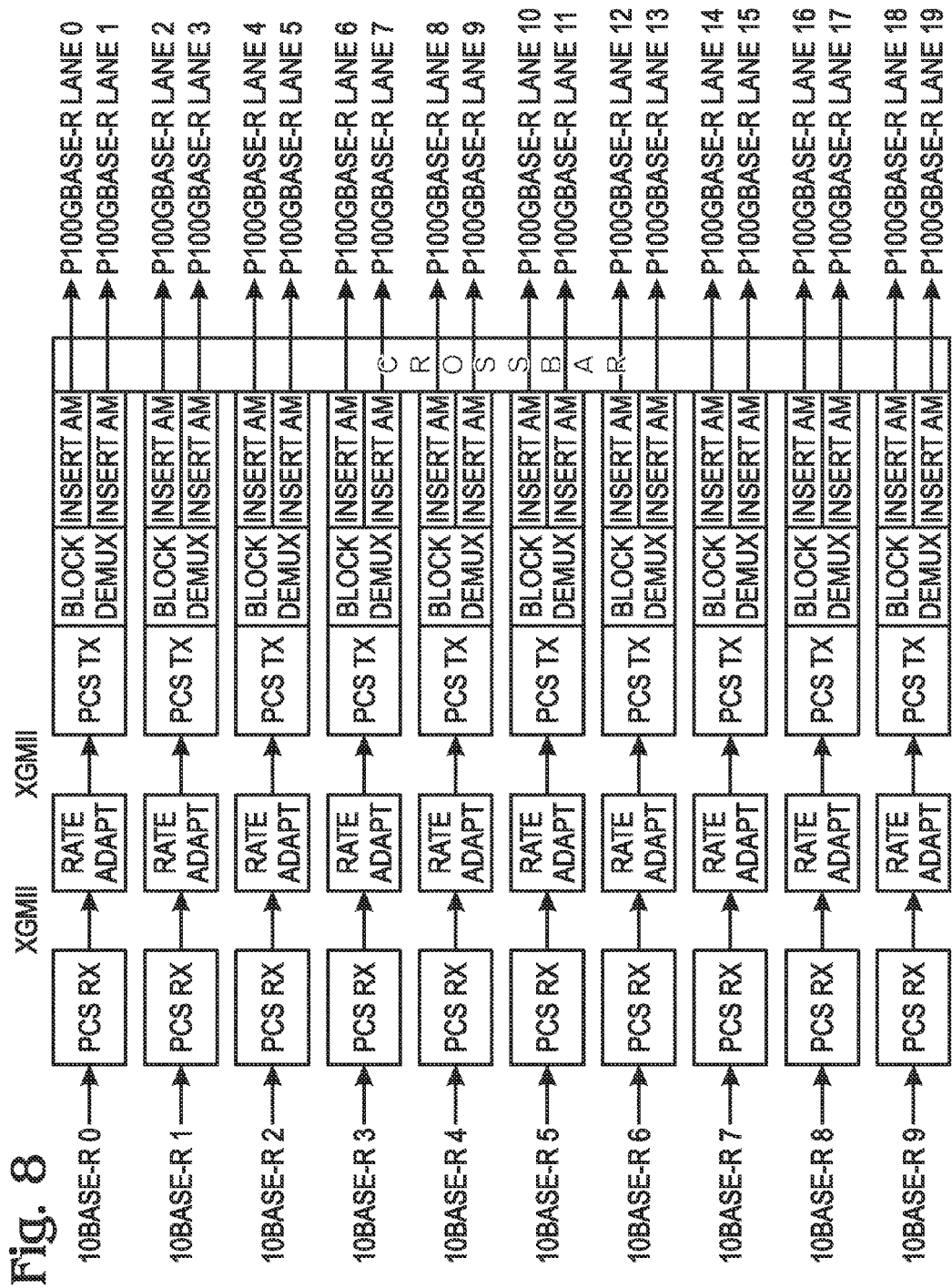
FIG. 8 is a diagram of an aggregator with a PCS termination block.

FIG. 8 is a diagram of an aggregator with a PCS termination block. The aggregators of FIGS. 7 and 8 are comprised of a set of 10 paths that convert a single 10GBASE-R channel to a pair of pseudo 100GBASE-R lanes, as well as an optional crossbar. Each conversion path is composed of the following set of functions:

- block sync/descramble (FIG. 7) or PCS RX (FIG. 8)
- rate adaption
- scramble (FIG. 7) or PCS TX (FIG. 8)
- block demux
- insert alignment marker (AM)

The block sync (FIG. 7) function determines the start of block of repeating 64B/66B blocks in the 10GBASE-R signal. Each 64B/66B block is a 66-bit block of which the first two bits are either 10 or 01, and the other 64 bits are scrambled. The start of block location is determined by finding a location where the 10 or 01 pattern is detected repeatedly every 66 bits. The block sync function may be implemented as specified in 802.3 Clause 49. This function is well known to those experienced with the 10GBASE-R PCS. Note that when the aggregator is co-located with the 10G PCS function, the start of block location may be known, in which case this function is optional.

The de-scrambler function (FIG. 7) de-scrambles the 64-bit payload of each 64B/66B block. The payload is scrambled using a 57 bit pseudo-random scrambler as specified in 802.3 Clause 49 to ensure a balance of ones and zeros and frequent occurrence of transitions in the data stream. This function may be implemented as specified in 802.3 Clause 49. This function is well known to those experienced with the 10GBASE-R PCS. Note that when the aggregator is co-located with the 10G PCS function the scrambler may optionally be disabled in the 10G PCS function and the de-scramble function is not required. The de-scramble function is required to be able to determine the contents of each block so that the inter-frame period may be determined. Also, when IDLE blocks are deleted the scrambling sequence is disturbed, so the scrambling must be re-done.

The PCS RX function (FIG. 8) includes the previously described block sync and de-scrambler functions. In addition, the PCS RX function fully terminates the PCS signals as specified in 802.3 Clause 49, and the output is an XGMII signal. Note that when the aggregator is co-located with the transmit MAC RS (see the TX aggregator in FIG. 5) the PCS RX function in the aggregator and the external PCS TX are not required, and the rate adapt function may take its input from the RS TX XGMII.

The rate-adapt function inserts/deletes IDLE characters to/from the incoming 10GBASE-R channel to match the outgoing signal rate. The signal rate may be different due to: (a) the insertion the AM blocks and (b) variations between the incoming and outgoing clock rates. If the incoming and outgoing clocks are the same, then only IDLE block deletion is required to allow for the AM block insertion.

When PCS termination is not used (FIG. 7), entire blocks are inserted or deleted at a time. Inserted blocks are blocks with eight IDLE characters. Deleted blocks are: (a) blocks with all IDLE characters, (b) a block with one group of 4 IDLE characters and one sequence ordered set, or (c) a block with two sequence ordered sets. See FIG. 5 for a depiction of the deletion process.

When PCS termination is used (FIG. 8), groups of 4 characters are inserted or deleted at a time. Inserted groups are groups of 4 IDLE characters. Deleted groups are either groups of 4 IDLE characters or sequence ordered sets. To maintain compliance, all rules in 802.3 with respect to adding and deleted groups for the purpose of rate matching should be followed.

For either rate adaptation method, the triggering method for adding or dropping blocks or ordered sets is the same. Incoming blocks are inserted into a rate adapt FIFO when received, and removed from the FIFO when transmitted. When the FIFO level is below a pre-defined threshold, IDLE groups are inserted at the next inter-frame period. When the FIFO level is above a pre-defined threshold, sequence ordered sets and/or IDLE groups are deleted at the next inter-frame period.

If the incoming and outgoing clock rates are the same, then only the deletion of IDLE groups and sequence ordered sets is required. Also, rather than using the FIFO fill as a trigger, the deletion may alternately be scheduled systematically as follows. Retain a deficit counter that increments every 16384 blocks and decrements when a block or group is deleted. When the counter value is greater than zero, one block or group is deleted at the next inter-frame. When PCS termination is not used, the counter is incremented by one every 16384 blocks and decremented by one when each block is deleted. When PCS termination is used the counter is incremented by two, every 16384 blocks, and is decremented by one when each IDLE group or sequence ordered set is deleted.

The scramble function (FIG. 7) scrambles the payload of each 64B/66B block. The payload is scrambled using a 57 bit pseudo-random scrambler as specified in 802.3 Clause 49 to ensure a balance of ones and zeros and the frequent occurrence of transitions in the data stream. This function may be implemented as specified in 802.3 Clause 49. This function is well known to those experienced with the 10GBASE-R PCS.

The PCS TX function (FIG. 8), includes the previously described scrambler function. In addition, the PCS TX function fully encodes the PCS signals as specified in 802.3 Clause 49.

The block demux function demultiplexes the blocks of a 10GBASE-R channel into two streams by taking one block and applying it to the first pseudo 100GBASE-R lane, and taking the next block and applying it to a second pseudo 100GBASE-R lane. This process is repeated so that odd blocks from the 10GBASE-R channel are applied to the first pseudo 100GBASE-R lane and even blocks are applied to the second pseudo 100GBASE-R lane. See FIG. 5 for a depiction of the block demux process.

The insert AM function adds lane alignment markers to each of the 100GBASE-R lanes. As required by 802.3ba Clause 82, an AM is inserted every 16384 blocks on each lane. The AM permits the alignment of the lanes to each other at the far end. As used herein, the AM may be used to align a pair of 100GBASE-R lanes corresponding to a single 10GBASE-R channel. The assignment of the lane number to each of the created lanes is arbitrary as long as the mapping is known and configured correspondingly at the far end.

An optional crossbar may be implemented to arbitrarily map each of the created lanes to any of the lane slots going into the CAUI-4 TX function.

Figure 9:
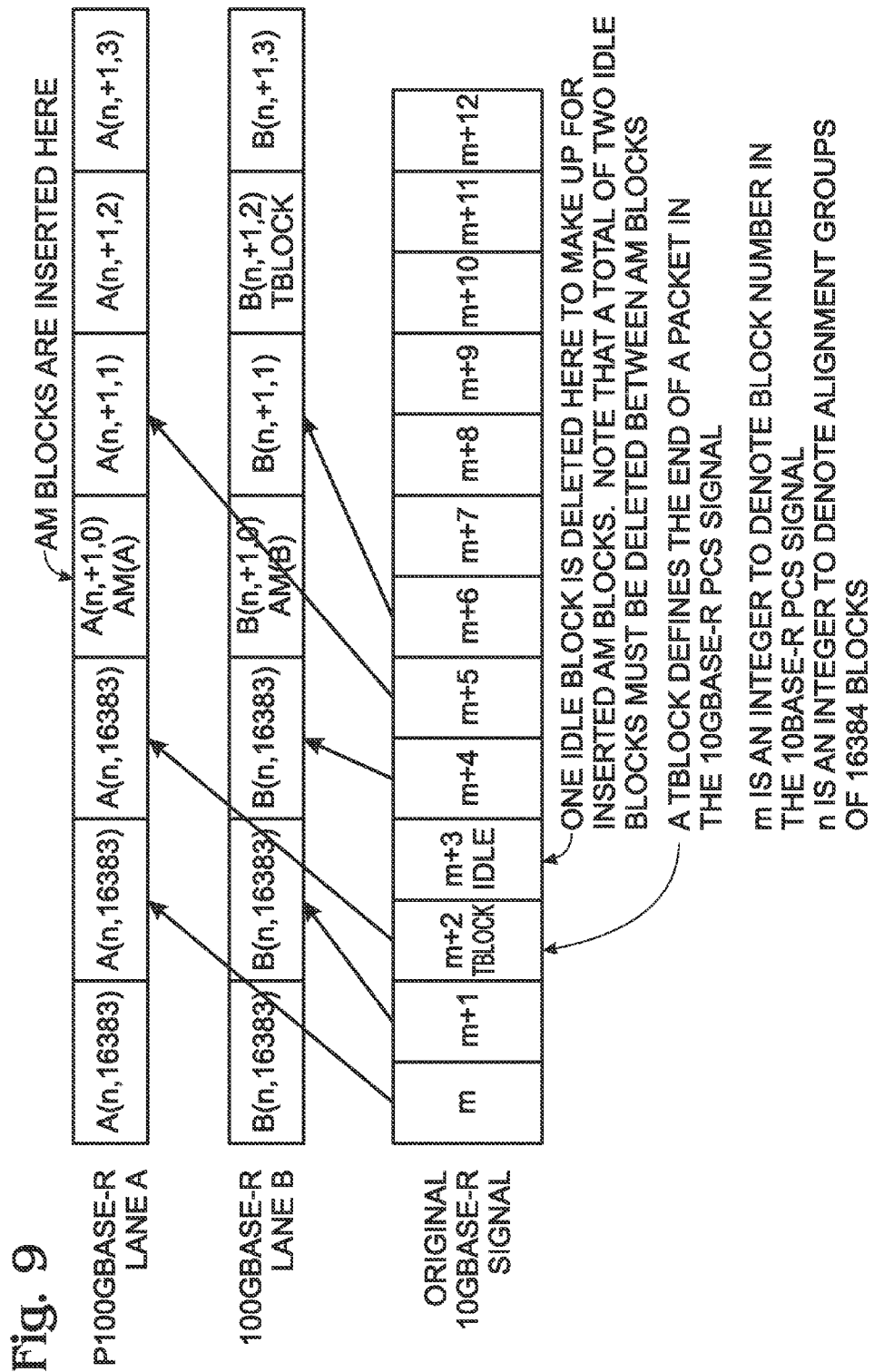
FIG. 9 is a block MUX and idle deletion timing diagram.

FIG. 9 is a block MUX and idle deletion timing diagram.

Figure 10:
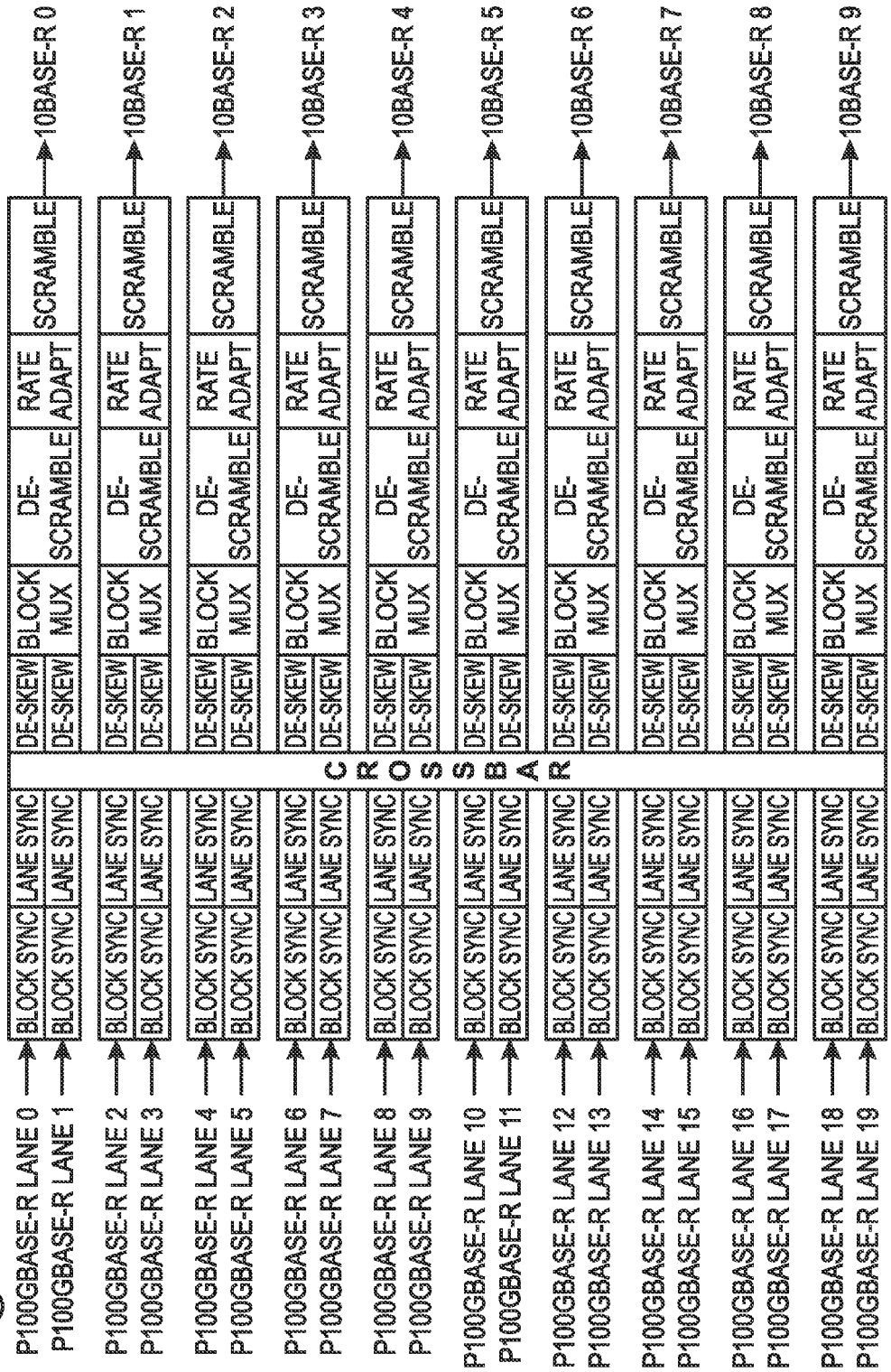
FIGS. 10 and 11 are diagrams depicting two forms of the de-aggregation function.
Figure 11:
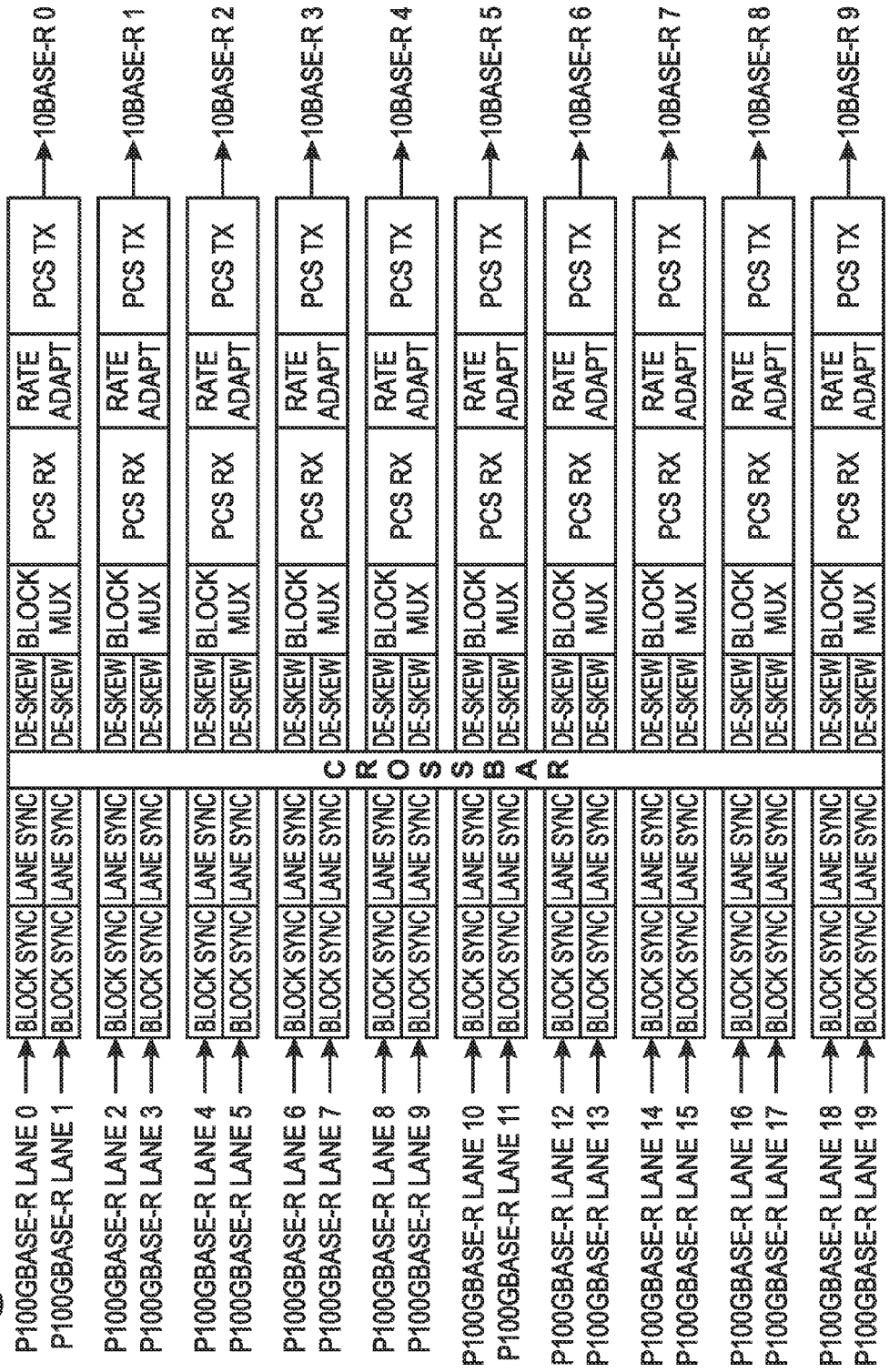

FIGS. 10 and 11 are diagrams depicting two forms of the de-aggregation function. The de-aggregator is composed of a set of 10 paths, which each revert a pair of 100GBASE-R lanes to a single 10GBASE-R channel with an optional crossbar. Each conversion path is composed of the following set of functions:

block sync
lane sync
de-skew
block mux
de-scramble (FIG. 10) or PCS RX (FIG. 11)
scramble (FIG. 10) or PCS TX (FIG. 11)

The block sync function determines the start of block of repeating 64B/66B blocks in the 10GBASE-R signal. Each 64B/66B block is a 66-bit block of which the first two bits are either 10 or 01 and the other 64 bits are scrambled. The start of block location is determined by finding a location where the 10 or 01 pattern is detected repeatedly every 66 bits. The block sync function may be implemented as specified in 802.3 Clause 49. This function is well known to those experienced with the 10GBASE-R PCS.

The lane sync function determines the location of the AM in each pseudo 100GBASE-R lane and determines the logical lane number based upon the AM. The lane sync function may be implemented as specified in 802.3 Clause 82. This function is well known to those experienced with the 100GBASE-R PCS. The lane sync function may optionally calculate the BIP-8 parity and retain a parity error count as specified in 802.3 Clause 82.

A crossbar may optionally be implemented to connect the correct pseudo 100GBASE-R lanes to each of the 10G paths. The alignment markers determined in the lane sync function may be used to determine which incoming lane to connect to each of the 10G path inputs based on a pre-determined configuration. The configuration may be static, dynamic, or programmable.

The de-skew function aligns each pair of the pseudo 100GBASE-R (depicted in the figure as "P100GBASE-R") lanes such that the alignment markers occur at the same point in time. Once aligned, the 10GBASE-R channel may be re-interleaved in the correct order. Note that unlike for 100GBASE-R, the de-skew is between pairs of lanes, not between all lanes, since the alignment with other lanes is not important. For the application of FIG. 5 (MAC device to 100G module) the skew is typically very small, probably in the order of a few 64B/66B blocks. For application of FIG. 6 (aggregation over 100G link) the skew between lanes may be as high as specified in 802.3 Clause 82 and should be designed with this in mind.

The block mux function re-interleaves the 64B/66B blocks in the pseudo 100GBASE-R lanes to regenerate the original 10GBASE-R channel. The previously inserted alignment markers are discarded in the process. The block uses the position of the AM to determine the starting point for interleaving each pair of pseudo 100GBASE-R lanes.

Figure 12:
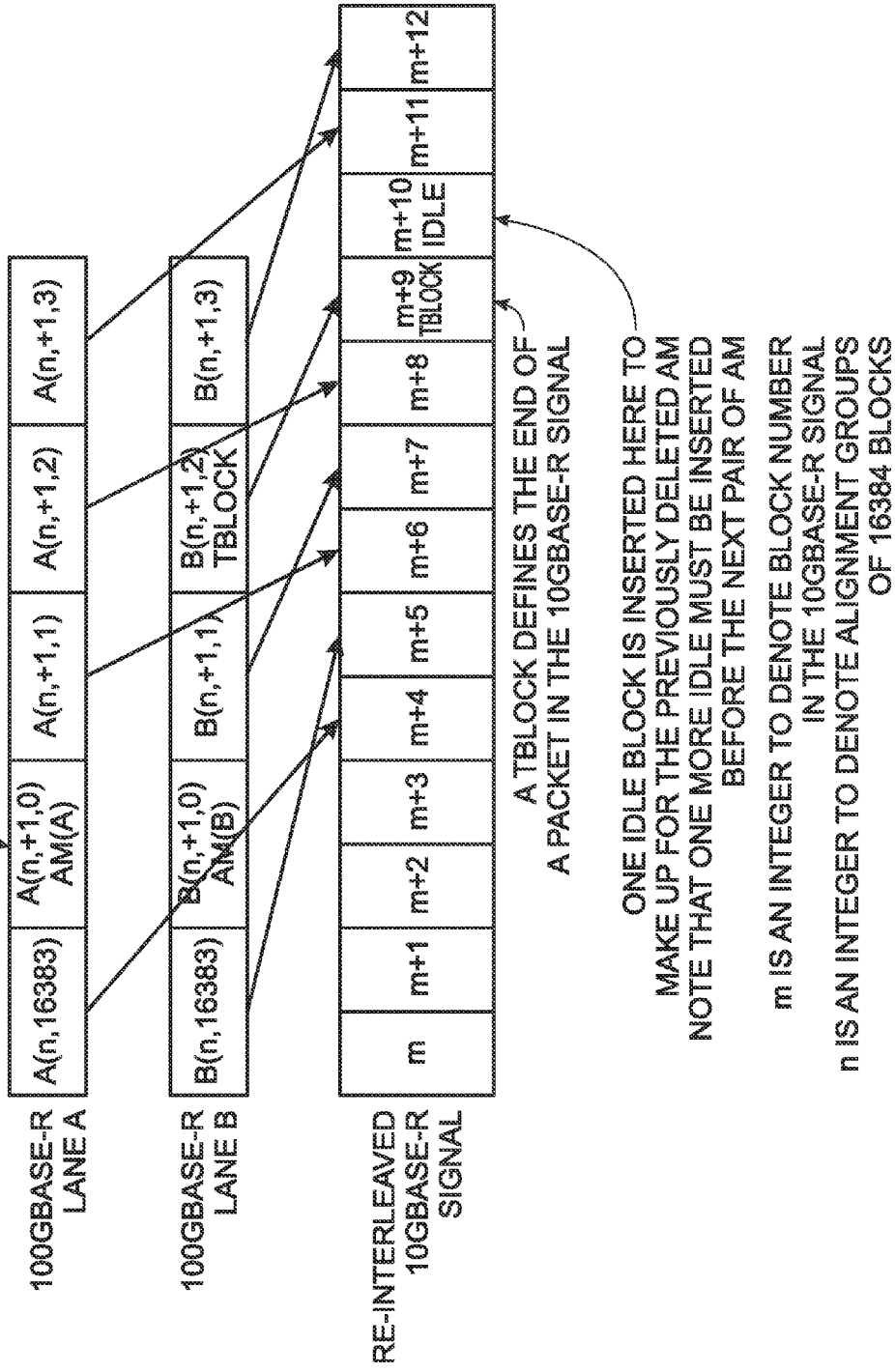
FIG. 12 is a block MUX and idle insertion timing diagram for the de-aggregator.

FIG. 12 is a block MUX and idle insertion timing diagram for the de-aggregator.

The de-scramble function (FIG. 11) in the de-aggregator has the same function and may be implemented in the same way as in the aggregator. The de-scramble function is always needed in the de-aggregator since, unlike in the aggregator, the signal is always scrambled. The de-scramble function is required to determine the contents of each block so that the inter-frame period may be determined. Also, when IDLE blocks are inserted or deleted, the scrambling sequence is disturbed, so the scrambling must be re-done.

The PCS RX function (FIG. 11) includes the previously described de-scrambler function. In addition, the PCS RX function fully terminates the PCS signals as specified in 802.3 Clause 49 and the output is an XGMII signal.

The rate-adapt function inserts IDLE groups into the data stream and/or deletes IDLE groups and sequence ordered sets from the data stream to match outgoing signal rate. The signal rate may be due to (a) the deletion of the AM blocks, and (b) the difference between the incoming and outgoing clock rates. If the incoming and outgoing clocks are the same, then only IDLE block insertion is required to allow for the AM block deletion.

When PCS termination is not used (FIG. 10) entire blocks are inserted or deleted at a time. Inserted blocks are blocks with eight IDLE characters. Deleted blocks are: (a) control blocks with all IDLE characters, (b) a block with one group of 4 IDLE characters and a sequence ordered set, or (c) a block with two sequence ordered sets. See FIG. 12 for a depiction of the IDLE insertion process.

When PCS termination is used (FIG. 11), groups of 4 characters are inserted or deleted at a time. Inserted groups are groups of 4 IDLE characters. Deleted groups are either groups of 4 IDLE characters or sequence ordered sets. To maintain compliance, all rules in 802.3 with respect to adding and deleting groups for the purpose of rate matching should be followed.

For either rate adaption method, the triggering method for adding or dropping blocks or ordered sets is the same. Incoming blocks are inserted into a rate adapt FIFO when received, and removed from the FIFO when transmitted. When the FIFO level is below a pre-defined threshold, IDLE ordered sets are inserted at the next inter-frame period. When the FIFO level is above a pre-defined threshold, sequence ordered sets or IDLE ordered sets are deleted at the next inter-frame period.

If the incoming and outgoing clock rates are the same, then only the insertion of IDLE groups is required. Also, rather than using the FIFO fill as a trigger, the insertion may alternately be scheduled systematically as follows. Retain a deficit counter that increments every 16384 blocks and decrements when a block or group is inserted. When the counter value is greater than zero, one block or group is inserted at the next inter-frame. When PCS termination is not used, the counter is incremented by one, every 16384 blocks, and is decremented by one when each block is inserted. When PCS termination is used, the counter is incremented by two, every 16384 blocks, and decremented by one when each IDLE group is inserted.

The scramble function (FIG. 10) in the de-aggregator has the same function and may be implemented in the same way as in the aggregator. The scramble function is not required if the 10GBASE-R PCS is co-located and the de-scramble function in the 10GBASE-R PCS RX can be disabled.

The PCS TX function (FIG. 11), includes the previously described scrambler function. In addition, the PCS TX function fully encodes the PCS signals as specified in 802.3 Clause 49. When the de-aggregator is co-located with the IRS RX (see RX de-aggregator in FIG. 5) then the PCS TX function is not required and the XGMII signal may attached directly to the RS RX function.

For the aggregator, it is essential that a valid 10GBASE-R PCS signal is received on each input. If any one of the signals as received from the PMA/PMD is failed, then a replacement 10GBASE-R signal must be inserted. There are many options for this signal from the RX receiver as follows:

Send blocks with local fault ordered sets (LOCAL FAULT blocks)
end blocks with all idle control characters (IDLE blocks)
Send blocks with all error control characters (/E/ blocks)

Figure 13A:
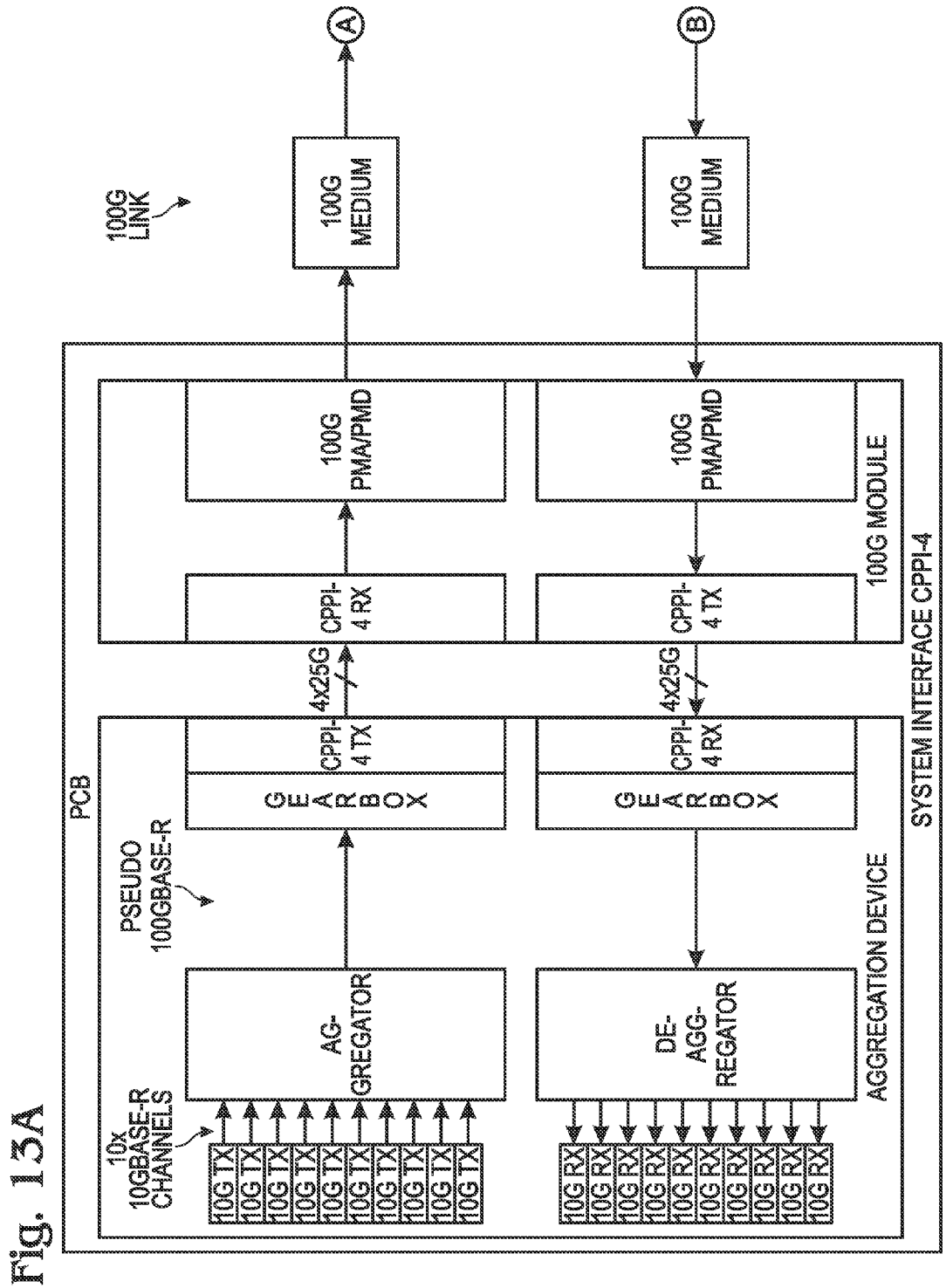
FIGS. 13A and 13B are schematic block diagrams depicting a variation of the application of FIGS. 6A and 6B.
Figure 13B:
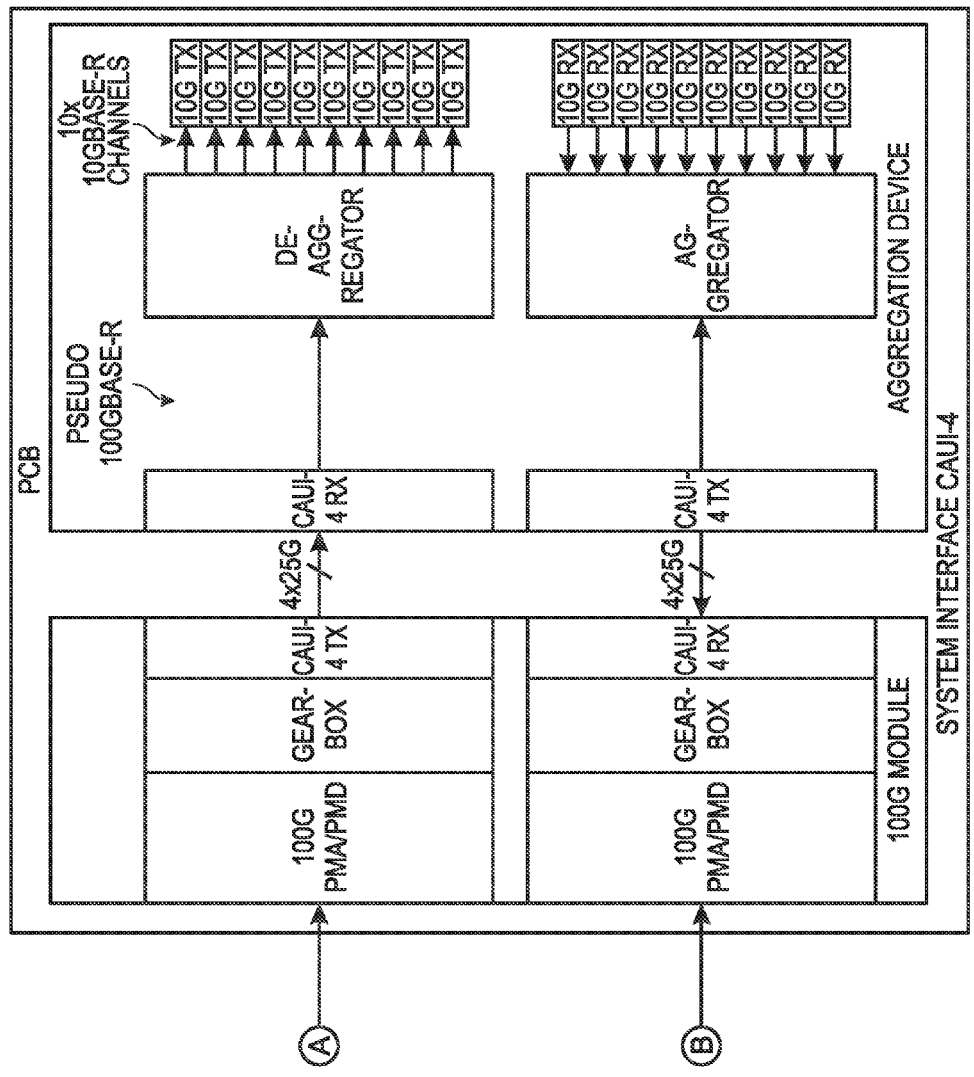

FIGS. 13A and 13B are schematic block diagrams depicting a variation of the application of FIGS. 6A and 6B. Contrasting the two implementations, in FIG. 13 the CAUI-4 RX and TX blocks can be removed (as shown), as the gearbox is in the same device as the aggregator and de-aggregator, and can be carried over to the 100G link. As shown, the 100G interface is directly connected to the optics. The CPPI interface may be 4-lane or 10-lane, or any other width supported by 100G (1, 2, 4, 5, or 10).

Figure 14A:
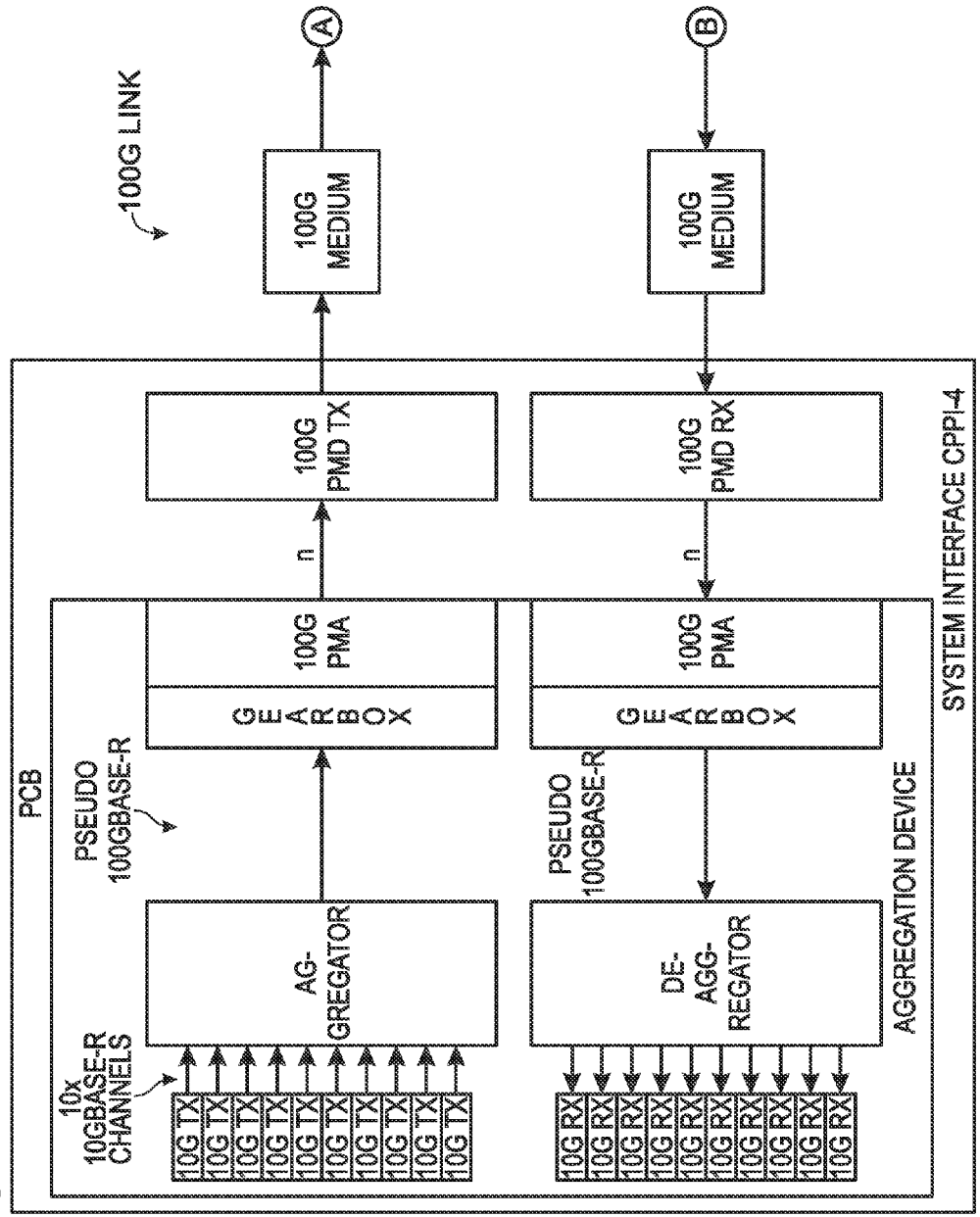
FIGS. 14A and 14B are schematic block diagrams depicting a variation where there is no 100G module and the aggregation device connects directly to the PMD.
Figure 14B:
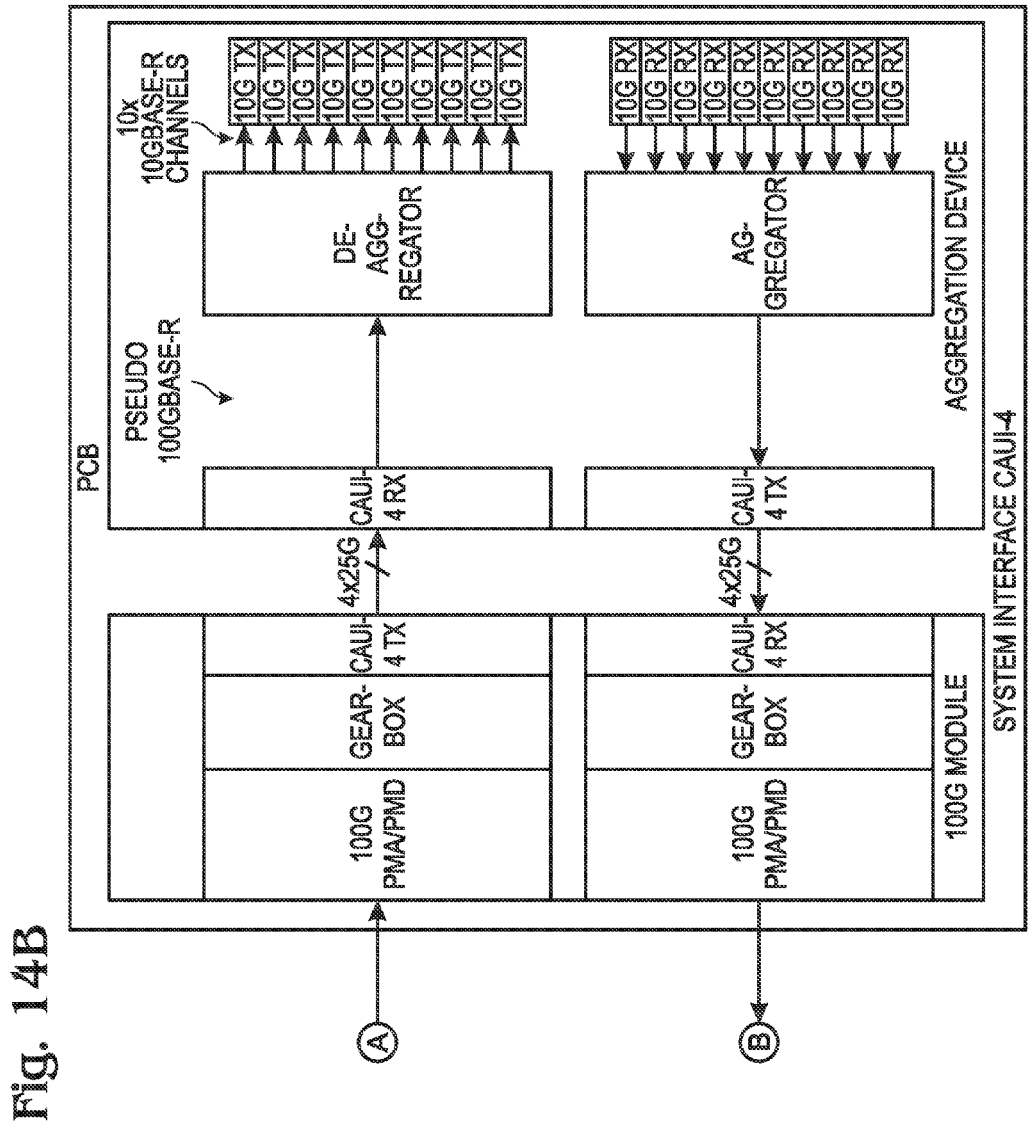

FIGS. 14A and 14B are schematic block diagrams depicting a variation where there is no 100G module and the aggregation device connects directly to the PMD. The PMD TX is the optical—TOSA or transmit optical sub-assembly, or electrical modulator or transmitter. The PMD RX is the optical—ROSA or receive optical sub-assembly, or electrical demodulator or receiver.

Figure 15:
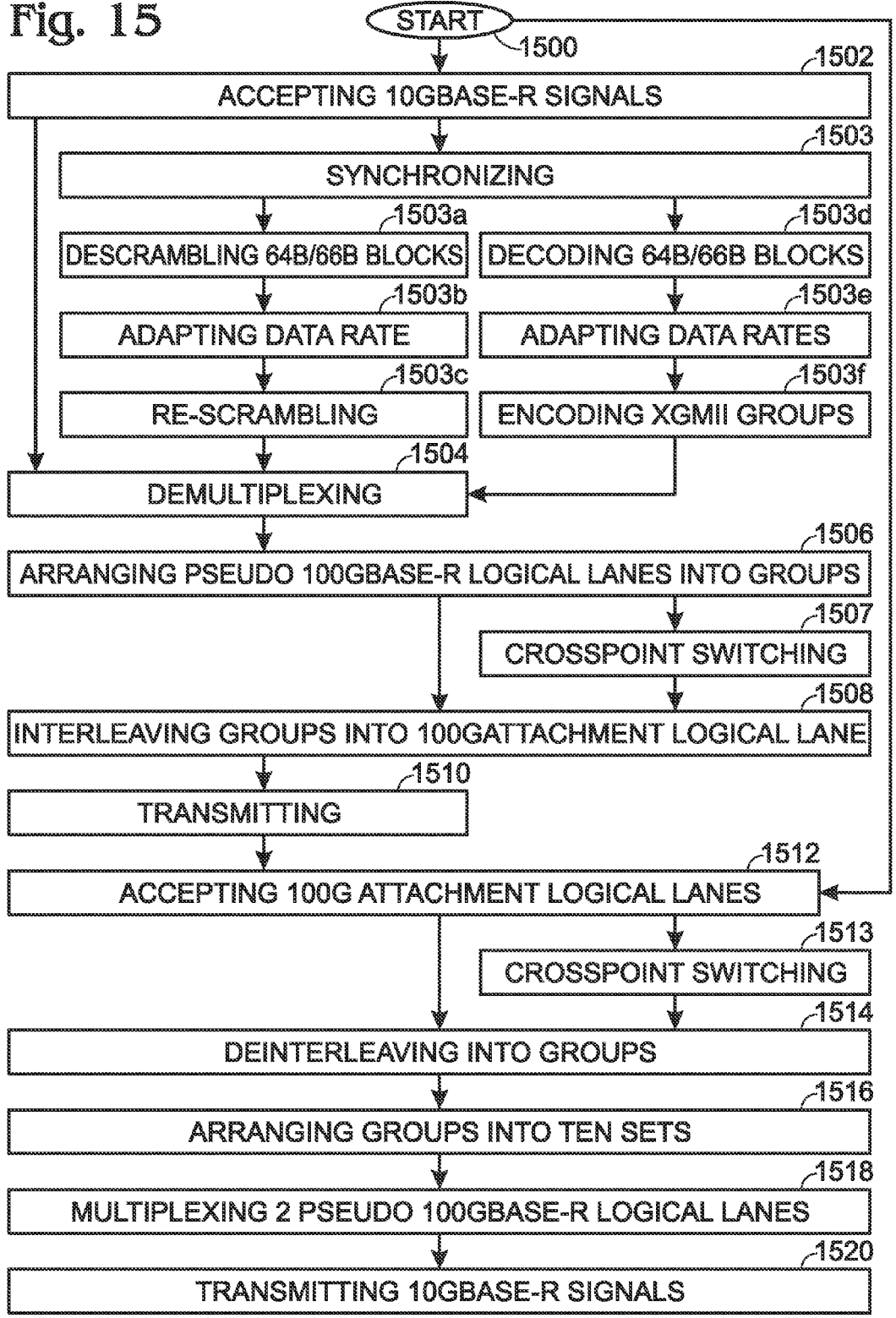
FIG. 15 is a flowchart illustrating a method for transceiving between a 10GBASE-R client interface and a 100G attachment interface in an Ethernet PI-HY module.

FIG. 15 is a flowchart illustrating a method for transceiving between a 10GBASE-R client interface and a 100G attachment interface in an Ethernet PHY module. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1500.

Step 1502 accepts a 10GBASE-R signal on each of ten client interface logical lanes. In one aspect, each client interface logical lane is associated with a corresponding physical lane. Step 1504 demultiplexes each 10GBASE-R logical lane into two 5 Gbps pseudo 100GBASE-R logical lanes, creating a total of twenty pseudo 100GBASE-R logical lanes. Step 1506 arranges the twenty pseudo 100GBASE-R logical lanes into n groups of 20/n pseudo 100GBASE-R logical lanes. Typically, n has the value of 1, 2, 4, 5, or 10. Step 1508 arranges the pseudo 100GBASE-R logical lanes from each group into a 100G attachment logical lane. For example, Step 1508 may interleave the 20/n pseudo 100GBASE-R logical lanes from each group into a 100G attachment logical lane. Step 1510 transmits a 100G attachment logical lane at an attachment interface, on each of n physical lanes.

Step 1512 accepts a 100G attachment logical lane at the attachment interface, on each of n physical lanes. Step 1514 deinterleaves each 100G attachment logical lane into a group of 20/n pseudo 100GBASE-R logical lanes. Again, n typically has a value of 1, 2, 4, 5, or 10. Step 1516 arranges the n groups of 20/n pseudo 100GBASE-R logical lanes into ten sets, where each set includes two pseudo 100GBASE-R logical lanes. Step 1518 multiplexes the two pseudo 100GBASE-R logical lanes in each set into a 10GBASE-R logical lane, creating a total of ten 10GBASE-R logical lanes. Step 1520 transmits a 10GBASE-R signal on each of ten client interface logical lanes.

In one aspect, interleaving the 20/n pseudo 100GBASE-R logical lanes from each group into the 100G attachment logical lane in Step 1508 includes interleaving the pseudo 100GBASE-R logical lanes into one of the following interfaces: 100 Gbps 10×10G CAUI-10, 100 Gbps 4×25G CAUI-4, 100 Gbps CPPI-N, where N is 1, 2, 4, 5, or 10, and 100GBASE-<a>R<b>, where <a> represents the interface type and <b> represents the number of physical lanes.

In one aspect, subsequent to accepting the 10GBASE-R signals at the client interface in Step 1502, Step 1503 synchronizes the 10GBASE-R signals. For example, Step 1503 may be performed with the following substeps. Step 1503a descrambles 10GBASE-R 64B/66B blocks. Step 1503b modifies the quantity of 10GBASE-R 64B/66B blocks to adapt data rates, and Step 1503c re-scrambles the 10GBASE-R 64B/66B blocks. Alternatively, Step 1503d decodes 10GBASE-R 64B/66B blocks into XGMII signals. Step 1503e modifies the quantity of XGMII groups to adapt data rates, and Step 1503f encodes the XGMII groups into 10GBASE-R 64B/66B blocks.

In another aspect, subsequent to arranging the twenty pseudo 100GBASE-R logical lanes into n groups of 20/n pseudo 100GBASE-R logical lanes in Step 1506, Step 1507 crosspoint switches the twenty pseudo 10GBASE-R logical lanes. Likewise, Step 1513 may crosspoint switch pseudo 100GBASE-R signals prior to their being deinterleaved into groups (Step 1514).

A system and method have been provided for transceiving between a 10GBASE-R client interface and a 100G attachment interface. Examples of particular message structures have been presented to illustrate the invention. However, the invention is not limited to merely these examples. Other variations and embodiments of the invention will occur to those skilled in the art.

We claim:

1. In an Ethernet physical layer (PHY) module, a method for transceiving between a 10GBASE-R client interface and a 100G attachment interface, the method comprising:
on each of ten client interface logical lanes, accepting a 10GBASE-R signal;
demultiplexing each 10GBASE-R logical lane into two 5 gigabit per second (Gbps) pseudo 100GBASE-R logical lanes, creating a total of twenty pseudo 100GBASE-R logical lanes;
arranging the twenty pseudo 100GBASE-R logical lanes into n groups of 20/n pseudo 100GBASE-R logical lanes;
arranging the pseudo 100GBASE-R logical lanes from each group into a 100G attachment logical lane; and,
on each of n physical lanes, transmitting a 100G attachment logical lane at an attachment interface.

2. The method of claim 1 wherein arranging the pseudo 100GBASE-R logical lanes from each group into a 100G attachment logical lane includes interleaving the 20/n pseudo 100GBASE-R logical lanes from each group into a 100G attachment logical lane.

3. The method of claim 1 further comprising:
on each of n physical lanes, accepting a 100G attachment logical lane at the attachment interface;
deinterleaving each 100G attachment logical lane into a group of 20/n pseudo 100GBASE-R logical lanes;
arranging the n groups of 20/n pseudo 100GBASE-R logical lanes into ten sets, where each set includes two pseudo 100GBASE-R logical lanes;
multiplexing the two pseudo 100GBASE-R logical lanes in each set into a 10GBASE-R logical lane, creating a total of ten 10GBASE-R logical lanes; and,
on each of ten client interface logical lanes, transmitting a 10GBASE-R signal.

4. The method of claim 2 wherein interleaving the 20/n pseudo 100GBASE-R logical lanes from each group into the 100G attachment logical lane includes interleaving the pseudo 100GBASE-R logical lanes into an interface selected from a group consisting of a 100 Gbps (gigabit per second) 10×10G Attachment Unit Interface (CAUI-10) interface, a 100 Gbps 4×25G Attachment Unit Interface (CAUI-4) interface, a 100 Gbps CPPI-N interface where N is selected from a group, consisting of 1, 2, 4, 5, and 10, and a 100GBASE-<a>R<b>, where <a> represents the interface type and <b> represents the number of physical lanes.

5. The method of claim 1 wherein arranging the twenty pseudo 100GBASE-R logical lanes into n groups includes n being equal to a value selected from a group consisting of 1, 2, 4, 5, and 10.

6. The method of claim 3 wherein arranging each 100G attachment logical lane into the group of 20/n pseudo 100GBASE-R logical lanes includes n being equal to a value selected from a group consisting of 1, 2, 4, 5, and 10.

7. The method of claim 1 further comprising:
subsequent to accepting the 10GBASE-R signals at the client interface, synchronizing the 10GBASE-R signals.

8. The method of claim 7 wherein synchronizing the 10GBASE-R signals comprises:
descrambling 10GBASE-R 64B/66B blocks;
modifying a quantity of 10GBASE-R 64B/66B blocks to adapt data rates; and,
re-scrambling the 10GBASE-R 64B/66B blocks.

9. The method of claim 7 wherein synchronizing the 10GBASE-R signals comprises:
decoding 10GBASE-R 64B/66B blocks into XGMII signals;
modifying a quantity of XGMII groups to adapt data rates; and,
encoding the XGMII groups into 10GBASE-R 64B/66B blocks.

10. The method of claim 3 further comprising:
subsequent to arranging the twenty pseudo 100GBASE-R logical lanes into n groups of 20/n pseudo 100GBASE-R logical lanes, crosspoint switching the twenty pseudo 100GBASE-R logical lanes.

11. The method of claim 1 wherein accepting the 10GBASE-R signal on each of ten client interface logical lanes includes each client interface logical lane being associated with a corresponding physical lane.

12. An Ethernet physical layer (PHY) module with a system for transceiving between a 10GBASE-R client interface and a 100G attachment interface, the system comprising:
an aggregator having a client interface of ten logical lanes, each logical lane accepting a 10GBASE-R signal, the aggregator demultiplexing each 10GBASE-R logical lane into two 5 gigabit per second (Gbps) pseudo 100GBASE-R logical lanes, creating a total of twenty pseudo 100GBASE-R logical lanes, the aggregator arranging the twenty pseudo 100GBASE-R logical lanes into n groups of 20/n pseudo 100G-BASE-R logical lanes, and arranging the pseudo 100GBASE-R logical lanes from each group into a 100G attachment logical lane, the aggregator having an attachment interface to transmit a 100G attachment logical lane on each of n physical lanes.

13. The system of claim 12 wherein the aggregator interleaves the 20/n pseudo 100GBASE-R logical lanes from each group into a 100G attachment logical lane.

14. The system of claim 12 further comprising:
a de-aggregator having an attachment interface to accept a 100G attachment logical lane on each of n physical lanes, the de-aggregator deinterleaving each 100G attachment logical lane into a group of 20/n pseudo 100GBASE-R logical lanes, and arranging the n groups of 20/n pseudo 100GBASE-R logical lanes into ten sets, where each set includes two pseudo 100GBASE-R logical lanes, the de-aggregator multiplexing the two pseudo 100GBASE-R logical lanes in each set into a 10GBASE-R logical lane, creating a total of ten 10GBASE-R logical lanes, and transmitting each 10GBASE-R signal via a logical lane at a client interface.

15. The system of claim 13 wherein the aggregator interleaves the 20/n pseudo 100GBASE-R logical lanes from each group into an interface selected from a group consisting of a 100 Gbps (gigabit per second) 10×10G Attachment Unit Interface (CAUI-100) interface, a 100 Gbps 4×250 Attachment Unit Interface (CAUI-4) interface, a 100 Gbps CPPI-N interface where N is selected from a group consisting of 1, 2, 4, 5, and 10, and a 100GBASE-<a>R<b>, where <a> represents the interface type and <b> represents the number of physical lanes.

16. The system of claim 12 wherein the aggregator arranges the twenty pseudo 100GBASE-R logical lanes into n groups, where n is equal to a value selected from a group consisting of 1, 2, 4, 5, and 10.

17. The system of claim 14 wherein the de-aggregator arranges each 100G attachment logical lane into the group of 20/n pseudo 100GBASE-R logical lanes, where n is equal to a value selected from a group consisting of 1, 2, 4, 5, and 10.

18. The system of claim 12 wherein the aggregator, subsequent to accepting the 10GBASE-R signals at the client interface, synchronizes the 10GBASE-R signals.

19. The system of claim 18 wherein the aggregator synchronizes the 10GBASE-R signals by descrambling 10GBASE-R 64B/66B blocks, modifying a quantity of 10GBASE-R 64B/66B blocks to adapt data rates, and re-scrambling the 10GBASE-R 64B/66B blocks.

20. The system of claim 18 wherein the aggregator synchronizes the 10GBASE-R signals by decoding 10GBASE-R 64B/66B blocks into XGMII signals, modifying a quantity of XGMII groups to adapt data rates, and encoding the XGMII groups into 10GBASE-R 64B/66B blocks.

21. The system of claim 14 wherein the aggregator, subsequent to arranging the twenty pseudo 100GBASE-R logical lanes into n groups of 20/n pseudo 100GBASE-R logical lanes, crosspoint switches the twenty pseudo 100GBASE-R logical lanes; and,
wherein the de-aggregator, subsequent to arranging the n groups of 20/n pseudo 100GBASE-R logical lanes into ten sets, crosspoint switches the twenty pseudo 100GBASE-R logical lanes.

22. The system of claim 12 wherein the aggregator client interface has a physical lane associated with each logical lane.

23. An Ethernet physical layer (PHY) module with a system for transceiving between a 10GBASE-R client interface and a 100G attachment interface, the system comprising:
a de-aggregator having an attachment interface to accept a 100G attachment logical lane on each of n physical lanes, the de-aggregator deinterleaving each 10G attachment logical lane into a group of 20/n pseudo 100GBASE-R logical lanes, and arranging the n groups of 20/n pseudo 100GBASE-R logical lanes into ten sets, where each set includes two pseudo 100GBASE-R logical lanes, the de-aggregator multiplexing the two pseudo 100GBASE-R logical lanes in each set into a 10GBASE-R logical lane, creating a total of ten 10GBASE-R logical lanes, and transmitting each 10GBASE-R signal via a logical lane at a client interface.

* * * * *